United States Patent
Sakai et al.

(10) Patent No.: US 8,427,372 B2
(45) Date of Patent: Apr. 23, 2013

(54) ARRAY ANTENNA

(75) Inventors: Fuminori Sakai, Kawasaki (JP); Kazuo Ohta, Kawasaki (JP)

(73) Assignee: Sakura Tech Corporation, Kanagawa (JP)

( * ) Notice: Subject to any disclaimer, the term of this patent is extended or adjusted under 35 U.S.C. 154(b) by 302 days.

(21) Appl. No.: 12/995,477

(22) PCT Filed: Dec. 7, 2009

(86) PCT No.: PCT/JP2009/070498
§ 371 (c)(1),
(2), (4) Date: Dec. 1, 2010

(87) PCT Pub. No.: WO2010/064723
PCT Pub. Date: Jun. 10, 2010

(65) Prior Publication Data
US 2011/0084880 A1  Apr. 14, 2011

(30) Foreign Application Priority Data

Dec. 5, 2008  (JP) .................................. 2008-335904
Jul. 13, 2009  (JP) .................................. 2009-181030

(51) Int. Cl.
*H01Q 3/26* (2006.01)
*H01Q 3/22* (2006.01)

(52) U.S. Cl.
USPC ............................ 342/375; 342/373; 342/374

(58) Field of Classification Search ........... 342/373–375
See application file for complete search history.

(56) References Cited

U.S. PATENT DOCUMENTS

| 3,657,656 A * | 4/1972 | Cooper ......................... 342/371 |
| 6,067,673 A | 5/2000 | Paese et al. |
| 2008/0204322 A1 | 8/2008 | Oswald et al. |

FOREIGN PATENT DOCUMENTS

| JP | 2001-510900 A | 8/2001 |
| JP | 2002-271126 A | 9/2002 |
| JP | 2003-515974 A | 5/2003 |
| JP | 2003-169017 A | 6/2003 |
| JP | 2004-194082 A | 7/2004 |
| JP | 2007-518968 A | 7/2007 |
| JP | 2008-540302 A | 11/2008 |

OTHER PUBLICATIONS

International Search Report (PCT/ISA/210) issued on Mar. 9, 2010, by Japanese Patent Office as the International Searching Authority for International Application No. PCT/JP2009/070498.
Office Action issued on Jun. 1, 2010, by Japanese Patent Office for Application No. 2010-510414.

* cited by examiner

*Primary Examiner* — Jack W. Keith
*Assistant Examiner* — Fred H Mull
(74) *Attorney, Agent, or Firm* — Buchanan Ingersoll & Rooney PC

(57) ABSTRACT

Disclosed is an electronic scanning array antenna which can be used as a UWB radar having an occupied band of not less than 500 MHz. An impulse generator is connected to each of a plurality of antenna elements constituting the electronic scanning array antenna, and a transmission trigger time to each of the impulse generators connected to the antenna elements is changed, whereby the phase of radio waves emitted from an antenna is equivalently changed. Moreover, a transmission trigger repletion interval is changed to thereby control a direction of a beam emitted from the array antenna. As means of changing a transmission trigger timing to each of the impulse generators connected to the antenna elements, a method of changing a frequency of a transmission trigger pulse and a method of changing a pulse position are adopted.

10 Claims, 25 Drawing Sheets

FIG. 4
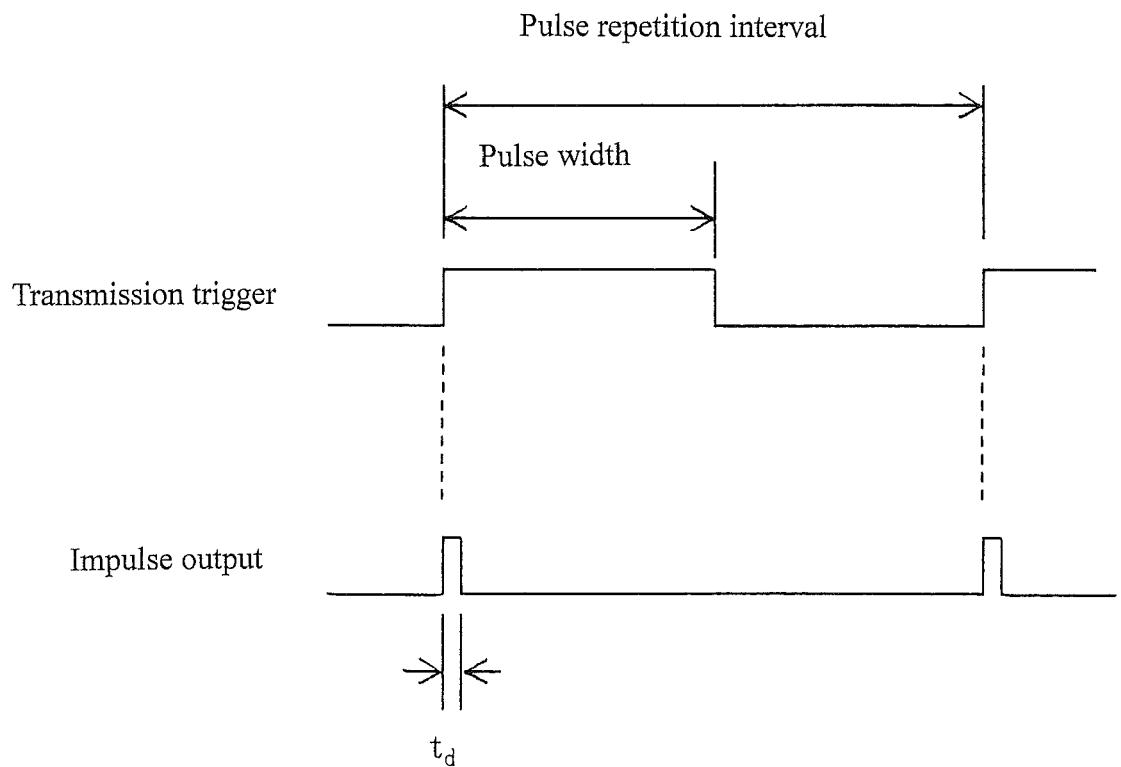
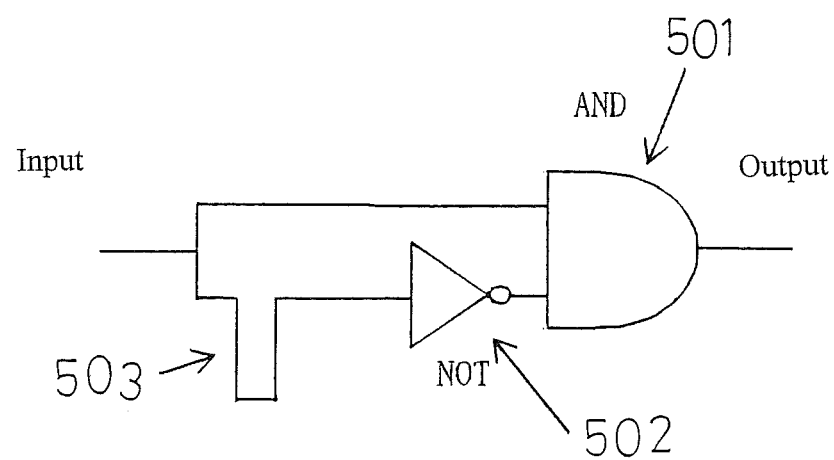
Delay amount $t_d$ by transmission line

FIG. 15
(a)
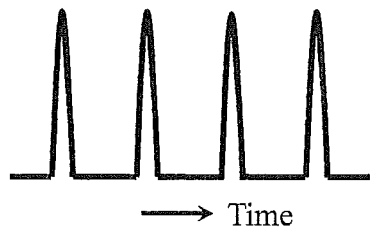
Transmission impulse waveform
(b)
Band-pass filter
frequency characteristics
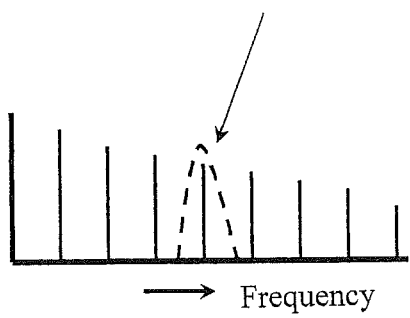
Frequency spectrum
of transmission impulse waveform
(c)
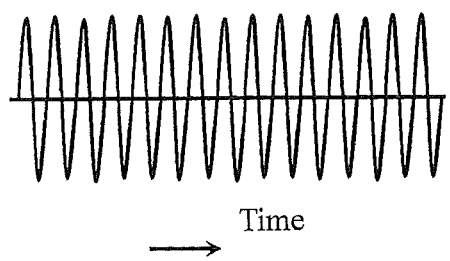
Waveform when one spectrum is
taken through band-pass filter
(d)
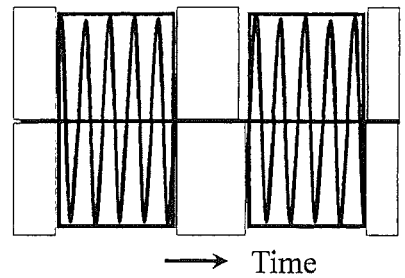
Transmission waveform
when modulation is applied by switch

ARRAY ANTENNA

TECHNICAL FIELD

The invention relates to an array antenna. The invention in particular relates to an electronic scanning array antenna which is used in a UWB (Ultra Wide Band) radar and so on and can control a direction of a beam emitted from the array antenna and a direction of a beam received by the array antenna at low cost using a simple mechanism.

BACKGROUND ART

A phase scanning method as a conventional representative method is illustrated in FIG. 1.

In the phase scanning method as a representative electronic scanning method, phase shifters 301 to 304 are respectively connected to a plurality of antenna elements 305 to 308, and a single phase controller 311 is connected to each of the phase shifters 301 to 304. A phase shift amount is controlled by the phase controller 311, and beam scanning is performed.

As the phase shifters 301 to 304, an easily-controlled digital phase shifter is generally used.

In the conventional phase scanning method, a wideband signal generated in an impulse generator 310 is distributed by an electric power distributor 309 to be supplied to each of the antenna elements 305 to 308.

Since a frequency band of a normal radar is narrow, the electric power distributor 309 and the phase shifters 301 to 304 do not vary widely, and thus fabrication is easy.

However, as with a UWB radar, it is difficult to fabricate a phase shifter having an occupied band of not less than 500 MHz and the phase shift amount is flat, and in addition, it is complex to control the phase shifter.

When a UWB radar is constituted by the conventional phase scanning method, a high-priced phase sifter is used, and in addition the number of components is large, and therefore, the cost may be increased.

PRIOR ART DOCUMENTS

Patent Documents
Patent document 1: Japanese Patent Laid-Open Publication No. 2002-271126

SUMMARY OF THE INVENTION

Problems to be Solved by the Invention

An object of this invention is to provide an electronic scanning array antenna which can be adopted as a UWB radar having an occupied band of not less than 500 MHz and can control a direction of beam emitted from the array antenna and a direction of beam received by the array antenna at low cost using a simple mechanism.

Means for Solving the Problems

In this invention, in an electronic scanning array antenna which can be adopted as a UWB radar having an occupied band of not less than 500 MHz, an impulse generator is connected to each of a plurality of antenna elements constituting the electronic scanning array antenna.

Then, a transmission trigger time to each of the impulse generators connected to each of the antenna elements is changed. Consequently, the phase of radio waves emitted from an antenna is equivalently changed.

Further, in this invention, in the above constitution, a transmission trigger repetition interval is changed to thereby control a direction of a beam emitted from the array antenna.

As means of changing a transmission trigger timing to each impulse generator connected to each antenna element, a method of changing a frequency of a transmission trigger pulse can be adopted. Further, a method of changing a pulse position can also be adopted.

Namely, in this invention, the impulse generator is connected to each of a plurality of antenna elements constituting the electronic scanning array antenna. The transmission trigger timing to each of the impulse generators is changed. Consequently, the phase of radio waves emitted from the antenna is equivalently changed.

As means of changing the transmission trigger timing, the method of changing the frequency of the transmission trigger pulse or the method of changing the pulse position is adopted.

In this invention, according to the above constitution, the direction of the beam emitted from the electronic scanning array antenna is controlled.

Specifically, not the conventional phase shifter but the impulse generator is connected to each of the plurality of antenna elements constituting the electronic scanning array antenna.

In order to control an impulse generation timing, a transmission trigger is supplied from one end of an array through a delay line connected to between antenna elements.

When the transmission trigger repetition interval changes, the transmission trigger supplied to each antenna element is delayed in proportion to the number passing through the delay line. By utilizing this, the beam direction is changed.

The delay lines and the impulse generator connected to each antenna element are used, and a beam control circuit of a UWB array antenna is realized with a simple constitution, in which the transmission trigger interval is changed to control a beam, and at low cost.

Further, there adopted a constitution in which the transmission trigger pulse with a changed pulse position is sent into the delay line, and the transmission trigger of each element turns on a switch in a desired timing to operate the impulse generator, and, thus, to control a beam.

According to the above constitution, the beam control circuit of the UWB array antenna is realized with a simple constitution and at low cost.

Namely, according to the invention of a first aspect is an electronic scanning array antenna is characterized in that a plurality of antenna elements constituting the electronic scanning array antenna are respectively connected to a single trigger generator through impulse generators; delay lines with different numbers are provided between the trigger generator and each of the impulse generators; and a time difference occurs between inputs to each of the antenna elements to thereby control a direction of a beam emitted from the electronic scanning array antenna.

According to the invention of a second aspect, an electronic scanning array antenna is characterised in that: a plurality of antenna elements constituting the electronic scanning array antenna are respectively connected to a single trigger generator through a correlation detecting circuit or a sampling circuit; delay lines with different numbers are provided between the trigger generator and each of the correlation detecting circuits or each of the sampling circuits; and a time difference occurs between inputs to each of the antenna elements to thereby control a direction of a beam received by the electronic scanning array antenna.

According to the invention of a third aspect, an electronic scanning array antenna is characterized in that: a plurality of antenna elements constituting the electronic scanning array antenna are respectively connected to a single trigger generator through impulse generators; the plurality of antenna elements are respectively connected to the trigger generator through a correlation detecting circuit or a sampling circuit; delay lines with different numbers are provided between the trigger generator and each of the impulse generators, and, at the same time, delay lines with different numbers are provided between the trigger generator and each of the correlation detecting circuits or each of the sampling circuits; a time difference occurs between inputs to each of the antenna elements to thereby control a direction of a beam emitted from the electronic scanning array antenna; and the time difference occurs between the inputs to each of the antenna elements to thereby control a direction of a beam received by the electronic scanning array antenna.

According to the invention of a fourth aspect, the electronic scanning array antenna according to any one of the first to third aspects, wherein the trigger generator is a variable frequency trigger generator.

According to the invention of a fifth aspect, the electronic scanning array antenna according to any one of the first to fourth aspects, is characterized in that a switch which performs on/off switching control of an input to each of the impulse generators based on an instruction of an on/off switching control signal is provided on the input side of each of the impulse generators.

According to the invention of a sixth aspect, an electronic scanning array antenna is characterised in that: an impulse generator is connected to each of a plurality of antenna elements constituting the electronic scanning array antenna; each of the impulse generators is connected to a single pulse position modulator receiving an input of a clock pulse from a clock generator; delay lines with different numbers are provided between the pulse position modulator and each of the impulse generators; and a time difference occurs between inputs to each of the antenna elements to thereby control a direction of a beam emitted from the electronic scanning array antenna.

According to the invention of a seventh aspect, an electronic scanning array antenna is characterised in that: a correlation detecting circuit or a sampling circuit is connected to each of a plurality of antenna elements constituting the electronic scanning array antenna; each of the correlation detecting circuits or each of the sampling circuits is connected to a signal pulse position modulator receiving an input of a clock pulse from a clock generator; delay lines with different numbers are provided between the pulse position modulator and each of the correlation detecting circuits or each of the sampling circuits; and a time difference occurs between inputs to each of the antenna elements to thereby control a direction of a beam received by the electronic scanning array antenna.

According to the invention of an eighth aspect, the electronic scanning array antenna according to the seventh aspect, is characterized in that a plurality of delay lines are connected in series to the pulse position modulator; a phase comparator is connected to a tail end or the middle of a wiring through which the plurality of delay lines are connected in series to the pulse position modulator; a phase of a trigger signal at a position where the phase comparator is connected and a phase of a signal output from the clock generator are compared with each other by the phase comparator; the comparison result of the phase comparator is input to the clock generator or input to a pulse position controller which inputs a pulse position control signal to the pulse position modulator.

According to the invention of a ninth aspect, the electronic scanning array antenna according to the first, third or sixth aspect, is characterized in that a narrowband filter is inserted into an output of the impulse generator.

According to the invention of a tenth aspect, the electronic scanning array antenna according to the second, fourth, or seventh aspect, is characterized in that a narrowband filter is inserted into an impulse generation output in the correlation detecting circuit or an impulse generation output in the sampling circuit.

Effects of the Invention

This invention can provide an electronic scanning array antenna which can control a direction of a beam emitted from the array antenna and a direction of a beam received by the array antenna at low cost using a simple mechanism.

BRIEF DESCRIPTION OF THE DRAWINGS

FIG. 4 is a view for explaining an example of a constitution of an impulse generator adopted as the UWB electronic scanning array antenna of this invention;

FIG. 15 is a view for explaining an operation of an embodiment of FIG. 14;

BEST MODES FOR CARRYING OUT THE INVENTION

Figure 1:
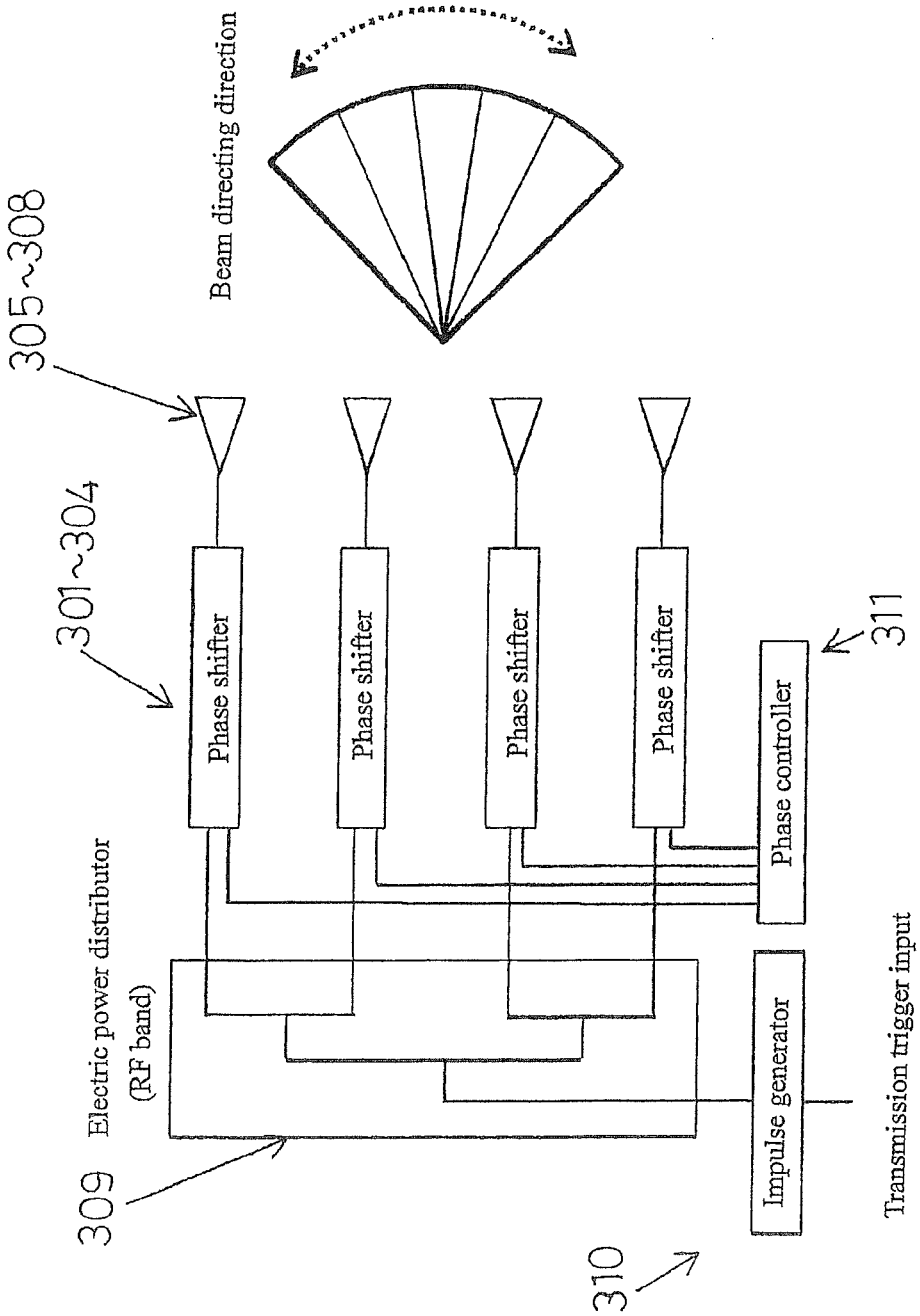
FIG. 1 is a view for explaining an example of a phase scanning method in the conventional array antenna.

In the electronic scanning array antenna of this invention, a plurality of antenna elements constituting the electronic scanning array antenna are respectively connected to a single trigger generator through impulse generators.

The trigger generator and each impulse generator have therebetween delay lines with different numbers.

According to the above constitution, in the electronic scanning array antenna of this invention, a time difference occurs between inputs to each of the antenna elements to thereby control a direction of a beam emitted from the electronic scanning array antenna.

Namely, in the electronic scanning array antenna of this invention, the impulse generators are respectively connected to the plurality of antenna elements constituting the array antenna. The adjacent antenna elements are connected to each other through the delay line, and a transmission trigger input is input from one end.

In the above constitution of the array antenna, a transmission trigger interval is changed, whereby an emission timing of impulse waves to be emitted is changed by the time difference between transmission triggers input to each antenna element. Consequently, the direction of the beam emitted from the array antenna is controlled.

In the above description, a correlation detecting circuit or a sampling circuit may be used instead of the impulse generator. According to this constitution, a time difference occurs between inputs to each of the antenna elements, whereby it is possible to realize a receiving array antenna which controls a direction of a beam received by the electronic scanning array antenna.

Namely, in the constitution of the array antenna in which a received signal input to each antenna element is subjected to correlation detection or sampling with a received trigger signal, the direction of the beam received by the array antenna is controlled by changing a reception trigger interval.

There can be provided the electronic scanning array antenna having a constitution combining the above constitution, in which a plurality of antenna elements constituting the electronic scanning array antenna are respectively connected to a single trigger generator through the impulse generators, and the transmission trigger timing is changed, whereby the direction of the beam emitted from the array antenna is controlled by the time difference between the transmission triggers input to each antenna element, and a constitution in which a correlation detecting circuit or a sampling circuit is used instead of the impulse generator, and the direction of the beam received by the array antenna is controlled by changing a reception trigger interval.

In the above electronic scanning array antenna of this invention, the trigger generator is allowed to be a variable frequency trigger generator.

According to the above constitution, a transmission trigger repetition frequency is changed, whereby a time difference is imparted to the transmission triggers input to each of the antenna elements. Consequently, the emission timing of impulse waves emitted from each of the impulse generators is changed, and the direction of the beam emitted from the array antenna is controlled.

Further, in the above electronic scanning array antenna of this invention, a switch which performs on/off switching control of the input to each of the impulse generators based on an instruction of an on/off switching control signal may be provided on the input side of each of the impulse generators.

According to the above constitution, a trigger signal from the delay line is switch-controlled, and a transmission wave is subjected to modulation.

In another electronic scanning array antenna proposed by this invention, an impulse generator is connected to each of a plurality of antenna elements constituting the electronic scanning array antenna, and the impulse generators are connected to a single pulse position modulator receiving an input of a clock pulse from a clock generator.

In the above case, delay lines with different numbers are provided between the pulse position modulator and each impulse generator.

According to the above constitution, a time difference occurs in the input to each of the antenna elements, whereby the direction of the beam emitted from the electronic scanning array antenna is controlled.

Namely, in the constitution of the array antenna, in which the impulse generator is connected to each of the plurality of antenna elements constituting the array antenna, the adjacent antenna elements are connected to each other through the delay line, and the transmission trigger pulse is input from one end, the transmission trigger repetition frequency is changed.

According to the above constitution, the transmission trigger repetition frequency is changed, whereby a time difference is imparted to the transmission trigger input to each antenna element. Consequently, the emission timing of impulse waves emitted from each of the impulse generators is changed, and the direction of the beam emitted from the array antenna is controlled.

Also in the above electronic scanning array antenna of this invention, a correlation detecting circuit or a sampling circuit may be used instead of the impulse generator. According to this constitution, the time difference occurs in the input to each antenna element, whereby the direction of the beam received by the electronic scanning array antenna is controlled.

Namely, a pulse position modulator is used instead of the above variable frequency trigger generator, and not a frequency but the position of the transmission trigger pulse is changed by the pulse position modulator.

According to the above constitution, the timing of the transmission trigger input to each antenna element is adjusted. Namely, the emission timing of impulse waves emitted from each of the impulse generators is changed, and the direction of the beam emitted from the array antenna is controlled.

In the above case, a plurality of delay lines are connected in series to the pulse position modulator, and a phase comparator is connected to a tail end or the middle of a wiring through which the plurality of delay lines are connected in series to the pulse position modulator. A phase of the trigger signal at the position where the phase comparator is connected and a phase of a signal output from the clock generator are compared with each other by the phase comparator. The comparison result of the phase comparator is input to the clock generator or may be input to a pulse position controller which inputs a pulse position control signal to the pulse position modulator.

The phase comparator detects a phase relationship between the trigger signal, taken from the tail end or the middle of the delay line, and the signal of the clock generator, and the frequency of the clock generator is controlled or the pulse position is controlled by a pulse position controller so that the phase relationship remains constant with respect to a change of a delay amount due to, for example, the temperature of the delay line.

In the electronic scanning array antenna of this invention, a narrowband filter may be inserted into the output of the impulse generator. Alternatively, a narrowband filter may be input to an impulse generation inserted into the correlation detecting circuit or an impulse generation output in the sampling circuit.

According to the above constitution, the impulse wave is oscillated to be converted into a continuous wave, and thereafter the continuous wave is amplitude modulated by a switch to be transmitted.

Alternatively, the continuous wave is input to a local of a mixer to be operated as a down convertor.

Hereinafter, the preferred embodiments of this invention will be described with reference to the attached drawings, using some examples. In the following embodiments, although four antenna elements are provided for example, the number of antenna elements is obviously not limited thereto.

First Embodiment

Figure 2:
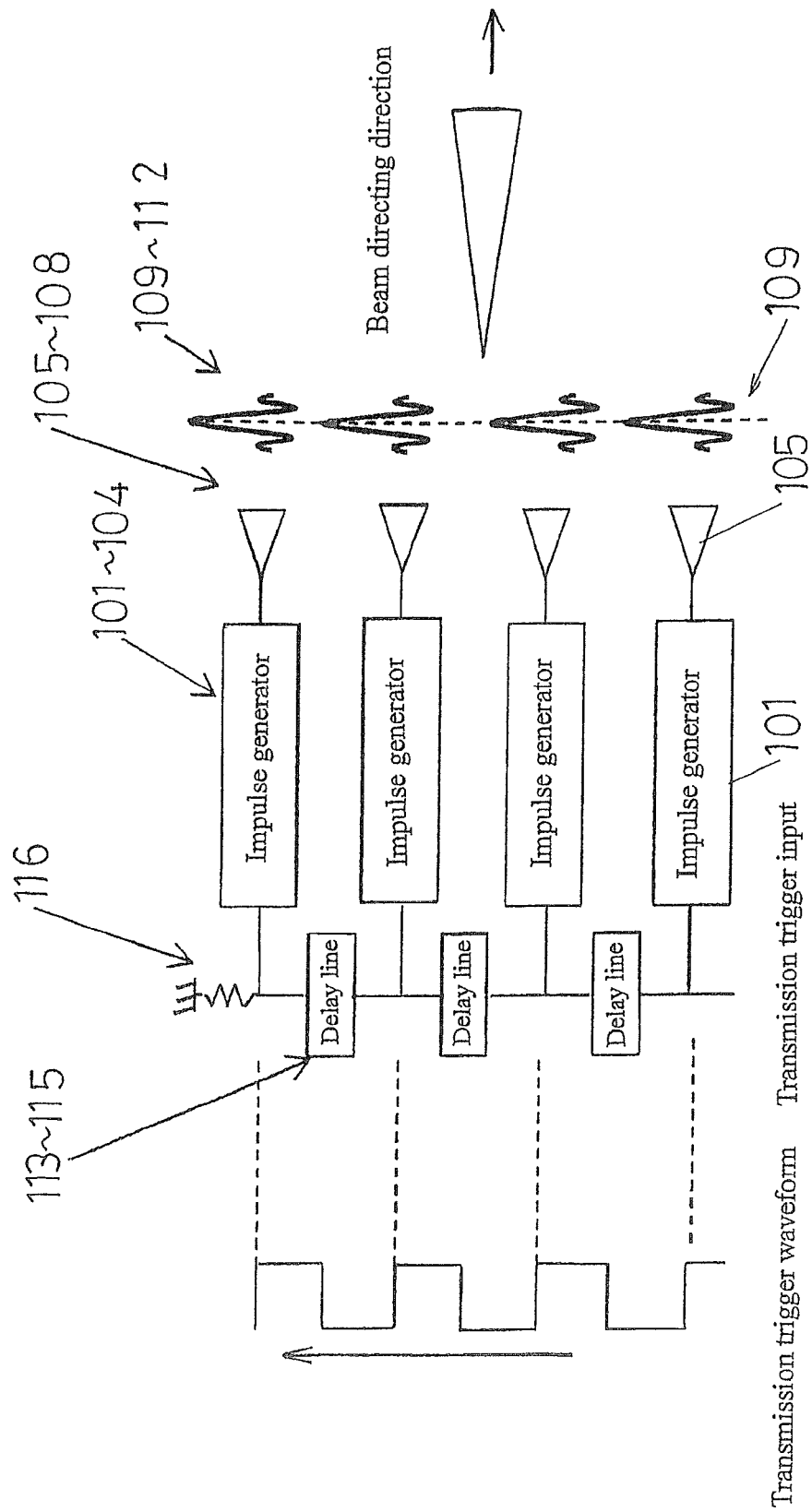
FIG. 2 is a view illustrating an example of a constitution of a UWB electronic scanning array antenna of this invention.

An example of a constitution of a UWB electronic scanning array antenna of this invention is illustrated in FIG. 2.

This embodiment will describe an example of the UWB electronic scanning array antenna for transmission in which an impulse generator is used.

Four antenna elements 105 to 108 are respectively connected to impulse generators 101 to 104 instead of the phase shifters 310 to 308 in the conventional example of FIG. 1.

The four impulse generators 101 to 104 are respectively connected to one common trigger generator (not illustrated).

In this embodiment, a plurality of delay lines 113 to 115 are connected in series to the trigger generator (not illustrated). Each of the impulse generators 101 to 104 are connected to different positions of a wiring through which the delay lines 113 to 115 are connected in series to the trigger generator (not illustrated).

According to the above constitution, the timing of generating an impulse from each of the impulse generators 101 to 104 is controlled. Namely, a transmission trigger is supplied from one end of the array through the delay lines 113 to 115 connected to between the antenna elements 105 to 108, and a terminator 116 is provided on the other end.

An example of a constitution of each of the impulse generators 101 to 104 is illustrated in FIG. 4. In the example illustrated in FIG. 4, a transmission trigger is divided into two, one of which is input to an AND circuit 501 and other of which is input from the delay line 503 with a long signal line to the AND circuit through a NOT circuit 502. Then, an impulse with a pulse width corresponding to a delay time is output from an AND circuit output.

By virtue of the above simple circuit, the impulse wave can be generated. In this example, although the logic circuit is used, an impulse generator using a step recovery diode may be used.

When the transmission trigger repetition timing changes, the transmission rigger supplied to each of the antenna elements 105 to 108 is delayed in proportion to the number passing through the delay lines 113 to 115. By utilizing this, a direction of a beam emitted from each of the antenna elements 105 to 108 is changed. Namely, the change of the transmission trigger interval causes a change in the emission direction of the impulse wave.

In the illustrated embodiment, the delay lines 113 to 115 are delayed by one period of the transmission trigger. Accordingly, even if the transmission trigger to each of the antenna elements 105 to 108 is delayed by periods, the impulse wave is emitted in the same timing, and, as illustrated in FIG. 2, resulting in a transmission trigger state in which the beam directs in the front direction.

Figure 3:
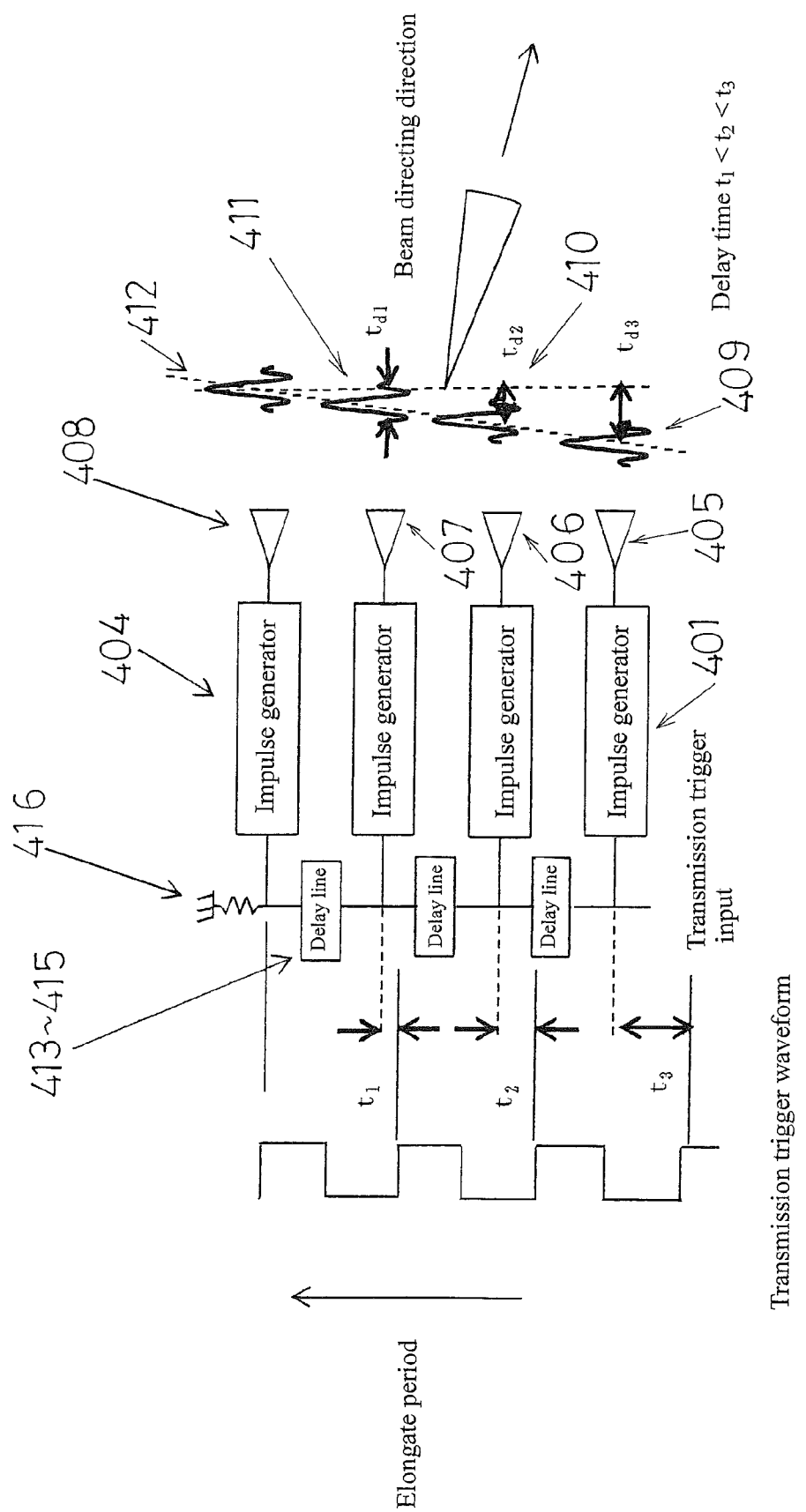
FIG. 3 is a view for explaining an operating principle in which a beam directing direction is changed from a front direction in the embodiment of FIG. 2.

FIG. 3 illustrates an operating principle in which a beam directing direction is changed from the front direction. The period of the transmission trigger is elongated, and the beam direction is changed. If the transmission timing period is long, the farther away from the antenna element 405 on the input side of the transmission trigger, and the closer to the antenna element 408 provided away from the antenna element 405, the faster the transmission trigger timing. According to this constitution, the closer to the antenna element 408 provided away from the antenna element 405, the faster the generation timing of the impulse wave, and impulse waveforms 409 to 412 sequentially travel on an antenna surface, and the directing direction changes.

By virtue of the use of impulse generators 401 to 404 connected to delay lines 413 to 415 and each of the antenna elements 405 to 408, the transmission trigger interval is changed, and the beam is controlled.

As described above, the beam control circuit of the UWB array antenna can be realized with a simple constitution and at low cost.

In this example, although the operation is explained with the impulse generator, a multiplier having a similar function also realizes a similar operation and may be replaced with the impulse generator.

Second Embodiment

Figure 5:
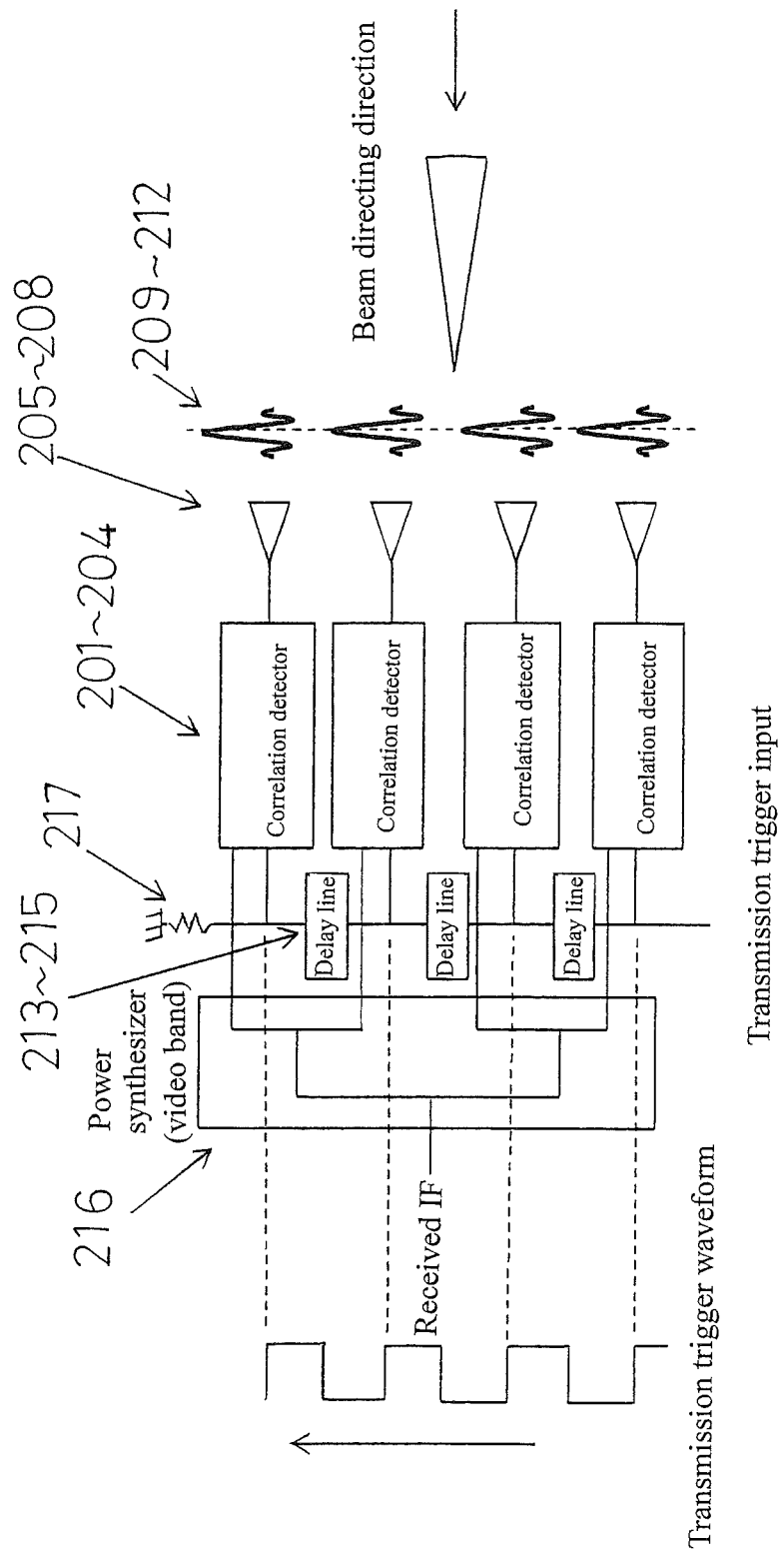
FIG. 5 is a view illustrating another example of the constitution of the UWB electronic scanning array antenna of this invention.

Another example of the constitution of the UWB electronic scanning array antenna of this invention is illustrated in FIG. 5.

This embodiment will describe an example of the UWB electronic scanning array antenna for reception in which a correlation detector is used instead of the impulse generator of the first embodiment.

Four antenna elements 205 to 208 are respectively connected to correlation detectors 201 to 204 instead of the phase shifters 301 to 308 in the conventional example of FIG. 1.

The four correlation detectors 201 to 204 are respectively connected to one common trigger generator (not illustrated).

In this embodiment, a plurality of delay lines 213 to 215 are connected in series to the trigger generator (not illustrated). Each of the correlation detectors 201 to 204 are connected to different positions of a wiring through which the delay lines 213 to 215 are connected in series to the trigger generator (not illustrated).

Namely, a reception trigger is supplied from one end of the array through the delay lines 213 to 215 connected to between the antenna elements 205 to 208, and a terminator 217 is provided on the other end. According to this constitution, a timing of inputting the reception trigger to each of the correlation detectors 201 to 204 is controlled.

The correlation detectors 201 to 204 sequentially sample a received signal from each of the antenna elements 205 to 208 with a reception trigger, and the reception signal is frequency converted to a video band to be transmitted to a video band power synthesizer 216.

Figure 6:
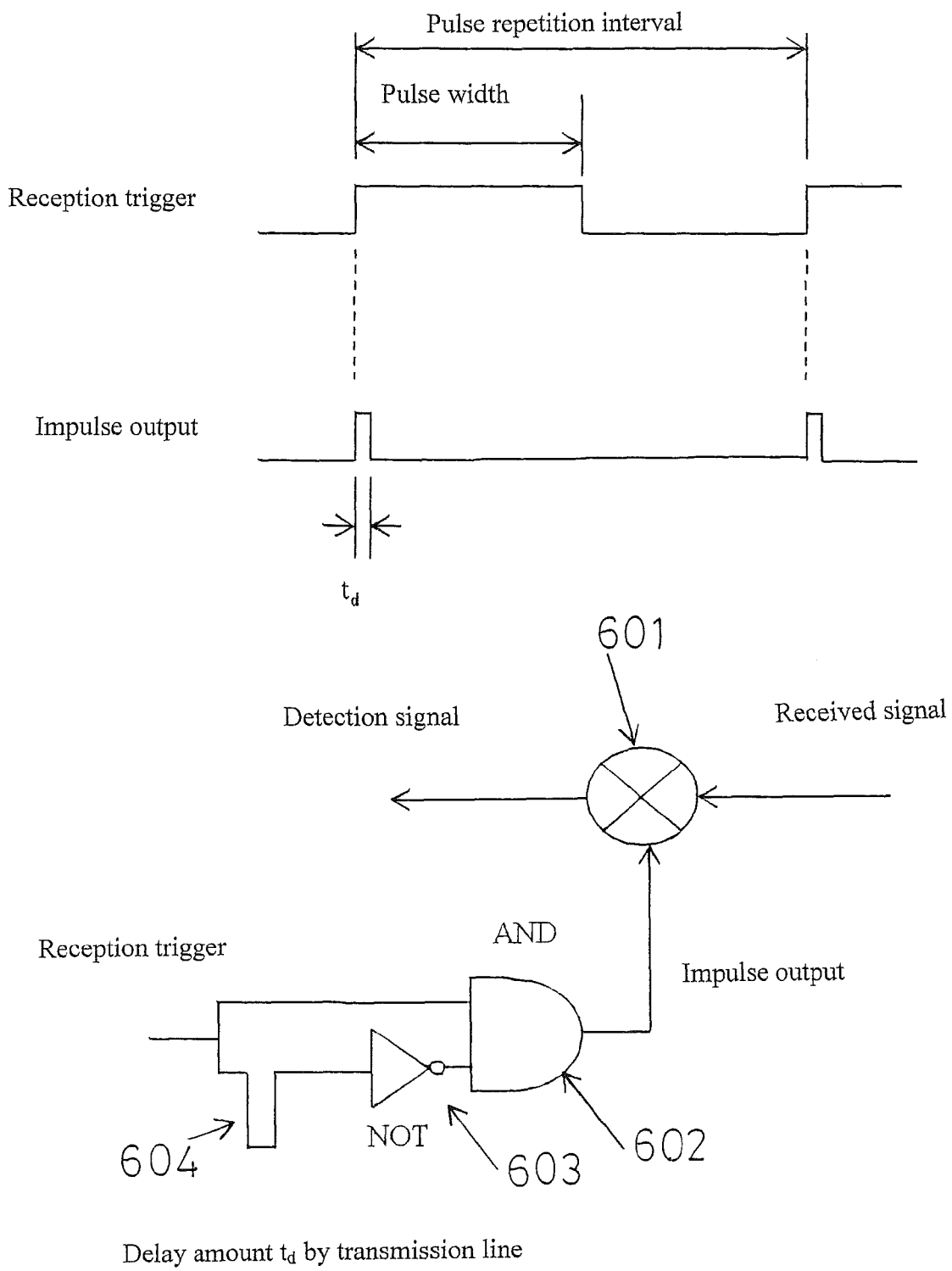
FIG. 6 is a view for explaining an example of a constitution of a correlation detector adopted as the UWB electronic scanning array antenna of this invention.

An example of a constitution of the correlation detectors 201 to 204 is illustrated in FIG. 6. In the embodiment illustrated in FIG. 6, there is a provided an impulse generator including an AND circuit 602, a NOT circuit 603, and a delay line 604. An output of the impulse generator is input to a local of a mixer 601, and correlation detection is performed.

In this example, the mixer is used as the means of the correlation detection; however, an AD convertor is used instead of the mixer, and even if an output pulse of the impulse generator is input as a sampling pulse for AD conversion to the AD convertor, a similar effect can be obtained.

Since the video band power synthesizer 216 in this embodiment has a frequency lower than the RF band electric power distributor 309 used in the conventional example of FIG. 1, the video band power synthesizer 216 can be easily fabricated.

Third Embodiment

Figure 7:
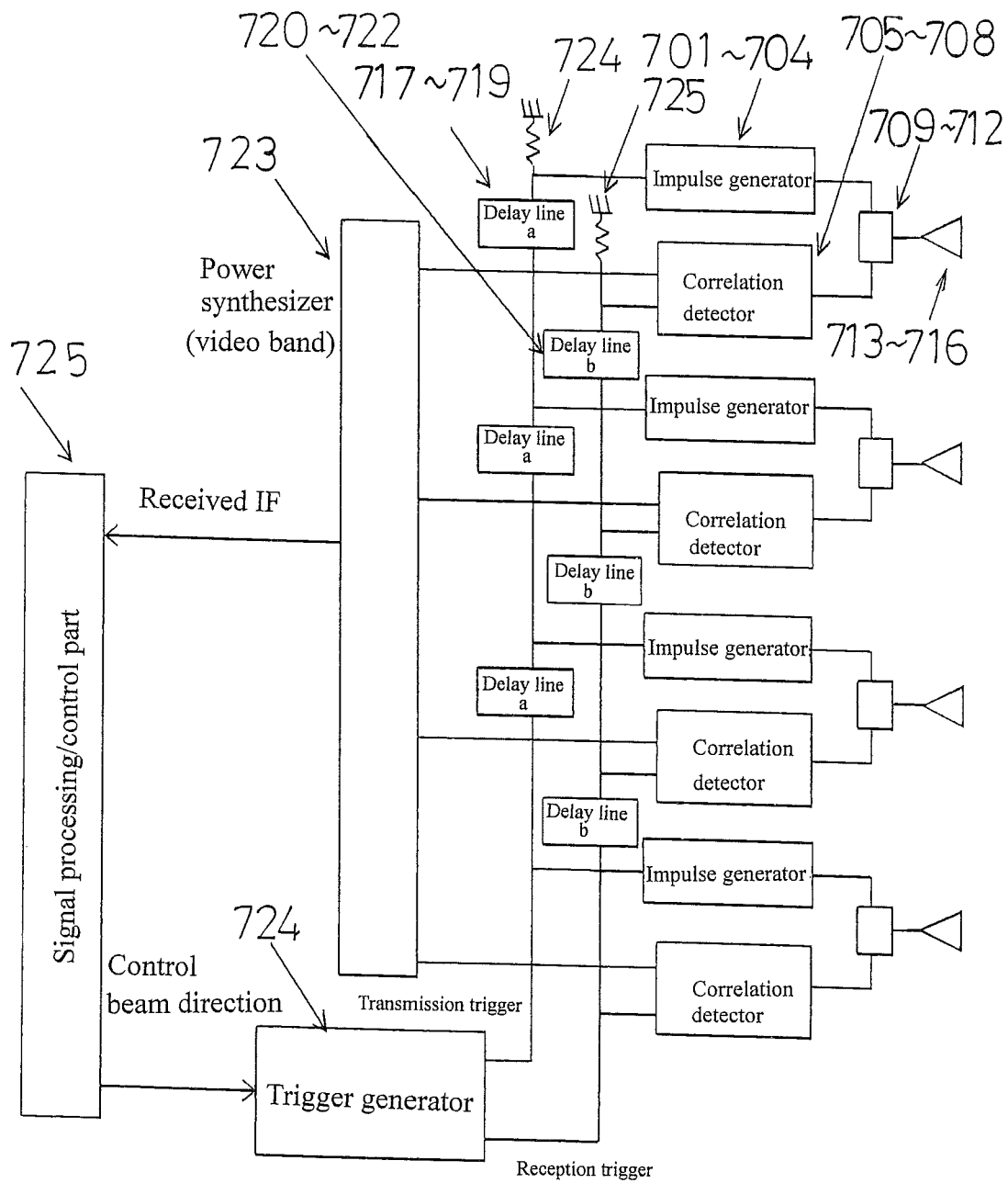
FIG. 7 is a view illustrating an example of the constitution of the UWB electronic scanning array antenna of this invention having a constitution in which an electronic scanning transmission array antenna adopts the embodiment of FIG. 2 and an electronic scanning reception array adopts the embodiment of FIG. 5.

FIG. 7 illustrates an example of the UWB electronic scanning array antenna of this invention having a constitution in which an electronic scanning transmission array antenna uses the first embodiment and an electronic scanning reception array antenna uses the second embodiment.

In the illustrated embodiment, since four antenna elements 713 to 716 are used in both transmission and reception, signals are separated by circulators 709 to 712.

A control signal of the beam direction is sent from a signal processing/control part 725 to a trigger generator 724, and the transmission trigger interval and the reception trigger interval are generated to realize designated transmission beam direction and reception beam direction.

A plurality of delay lines a 717 to 719 are connected in series to the trigger generator 724. Each of the impulse generators 701 and 704 are connected to different positions of a wiring through which the delay lines a 717 to 719 are connected in series to the trigger generator 724.

According to the above constitution, the timing of generating the impulse from each of the impulse generators 701 to 704 is controlled. Namely, the transmission trigger is supplied from one end of the array through the delay lines a 717 to 719 connected to between the antenna elements 713 to 716, and a terminator 724 is provided on the other end.

A plurality of delay lines b 720 to 722 are connected in series to the trigger generator 724. Each of the correlation detectors 705 to 708 are connected to different positions of a wiring through which the delay lines b 720 to 722 are connected in series to the trigger generator 724.

Namely, the reception trigger is supplied from one end of the array through delay lines b 720 to 722 connected to between the antenna elements 713 to 716, and a terminator 725 is provided on the other end. According to this constitution, the timing of inputting the reception trigger to each of the correlation detectors 705 to 708 is controlled.

The transmission trigger signal is sent to the impulse generators 701 to 704 through the delay lines a 717 to 719, and the impulse waves are emitted from the antenna elements 713 to 716.

On the other hand, in the reception, in order to receive a signal from the transmission direction, the reception trigger is generated so that the reception beam direction coincides with the transmission beam direction.

The correlation detectors 705 to 708 sequentially sample a received signal from each of the antenna elements 713 to 716 with the reception trigger, and the reception signal is frequency converted to a video band to be transmitted to a power synthesizer 723.

In order to perform sequential sampling, since sampling is required to be performed with an interval longer than the transmission interval, the delay lines a 717 to 719 for transmission and the delay lines b 720 to 722 of a reception system are different in delay amount.

Fourth Embodiment

Figure 8:
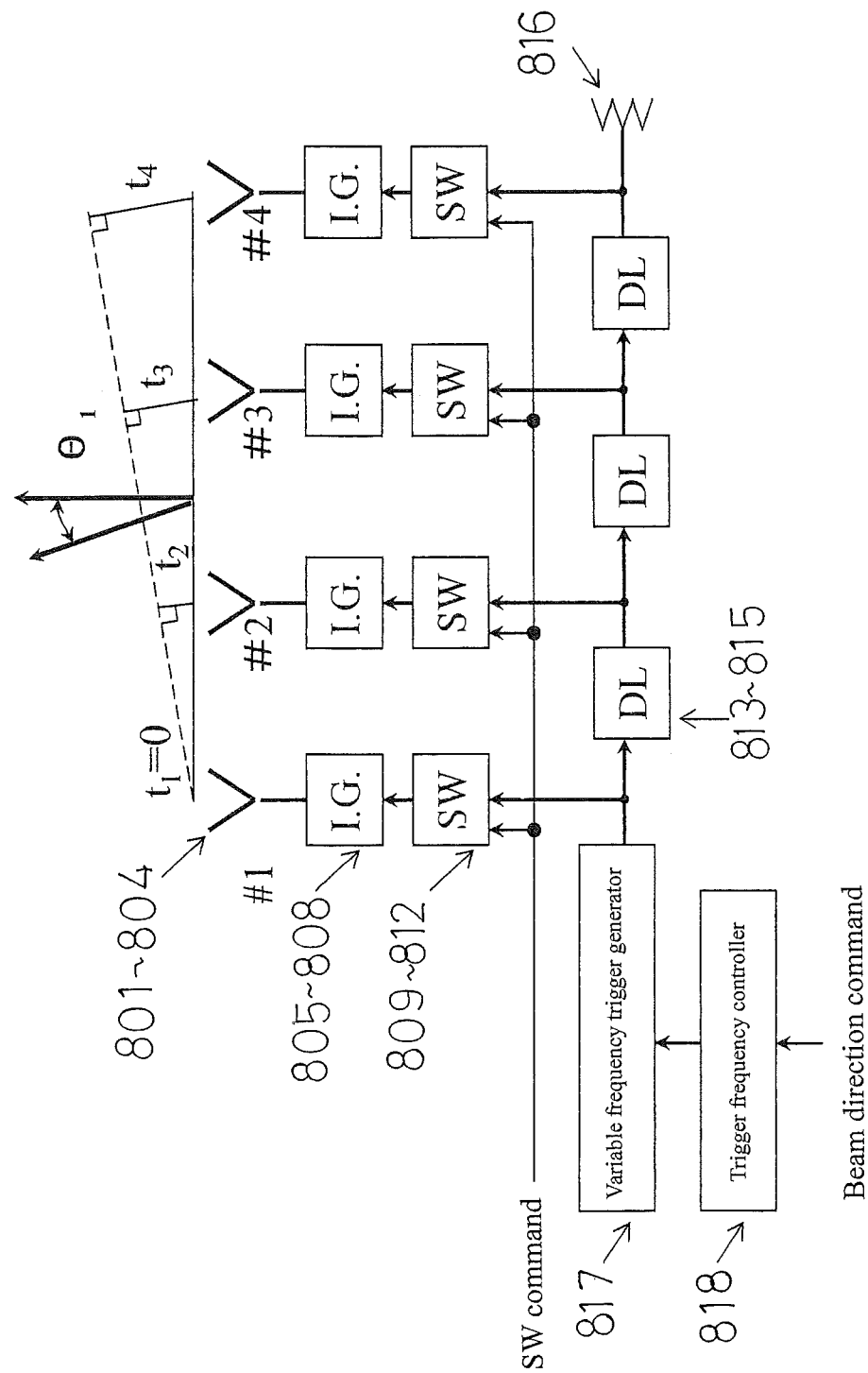
FIG. 8 is a view illustrating an example of another constitution of the UWB electronic scanning array antenna of this invention.

An example of the constitution of the UWB electronic scanning array antenna of this invention is illustrated in FIG. 8.

This embodiment will describe an example of the UWB electronic scanning array antenna for transmission, in which an impulse generator is used, as in the first embodiment.

As in the first embodiment, four antenna elements 801 to 804 are respectively connected to impulse generators 805 to 808 instead of the phase shifters 301 to 308 in the conventional example of FIG. 1.

The four impulse generators 805 to 808 are respectively connected to one common trigger generator. In this embodiment, as the trigger generator, a variable frequency trigger generator 817 is adopted.

In the illustrated embodiment, the variable frequency trigger generator 817 is controlled by a trigger frequency controller 818.

The trigger frequency controller 818 receiving a beam direction command controls a transmission trigger frequency of the variable frequency trigger generator 817 so as to realize the transmission trigger interval corresponding to a direction in which beam is to be directed.

In this embodiment, the transmission trigger interval changes to thereby change the direction of emitting the impulse wave.

A plurality of delay lines 813 to 815 are connected in series to the variable frequency trigger generator 817. Each of the impulse generators 805 to 808 are connected to different positions of a wiring through which the delay lines 813 to 815 are connected in series to the variable frequency trigger generator 817.

Namely, in order to control the impulse generation timing, the transmission trigger from the variable frequency trigger generator 817 is supplied from one end of the array through the delay lines 813 to 815 connected to between the antenna elements 801 to 804, and a terminator 816 is provided on the other end.

According to the above constitution, the timing of generating the impulse from each of the impulse generators 805 to 808 is controlled.

When the transmission trigger repetition interval changes, the transmission rigger supplied to each of the impulse generators 805 to 808 respectively connected to each of the antenna elements 801 to 804 is delayed in proportion to the number passing through the delay lines 813 to 815. By utilizing this, the beam direction is changed.

When one period of the repetition interval corresponds to the delay amount of each of the delay lines 813 to 815, even if the transmission trigger to each of the antenna elements 801 to 804 is delayed by periods, the impulse wave is emitted in the same timing, the beam directs in the front direction.

Meanwhile, if the transmission timing period is long, the farther away from a reference antenna element on the input side of the transmission trigger, and the closer to the antenna element provided away from the reference antenna element, the faster the transmission trigger timing, and the faster the emission timing of the impulse wave. According to this constitution, impulse waveforms are sequentially travel on an antenna surface, and the directing direction is changed. When the transmission timing period is short, the directing direction is reversed.

As described in the first embodiment, by virtue of the use of the delay lines 813 to 815 and the impulse generators 805 to 808 connected respectively to each of the antenna elements 801 to 804, the transmission trigger interval is changed to control the beam. The beam control circuit of the UWB array antenna is realized with a simple constitution and at low cost.

In the illustrated embodiment, in addition to the constitution illustrated in FIG. 1, switches (SW) 809 to 812 for turning on/off the transmission trigger are provided at the inputs of the impulse generators 805 to 808. According to this constitution, on/off of the impulse wave is enabled by a control signal (SW command) in accordance with communication information, and ASK modulation (OOK) communication can be realized.

Namely, the switches SW 809 to 812 receive the control signal (SW command) generated from the communication information to turn on/off the transmission trigger at the inputs of the impulse generators 805 to 808. Thereby, ASK modulated (OOK) impulse waves are emitted from the antenna elements 801 to 804 in accordance with the communication information.

The switches SW 809 to 812 are regularly turned on/off with a certain period, whereby even when the transmission trigger repetition frequency is high, the transmission interval of the impulse can be delayed.

According to the above constitution, since the transmission trigger frequency input to the delay lines 813 to 815 can be increased as high as possible, delay lines with a small delay amount can be used. Thus, delay lines with small delay amount error and temperature change can be used.

With regard to the impulse generators 805 to 808, impulse generators having a similar constitution to that of the impulse generators 101 to 104 described using FIG. 4 in the first embodiment may be used. Namely, the impulse wave can be emitted with a simple circuit described using FIG. 4 in the first embodiment. As described in the first embodiment, an impulse generator using a step recovery diode may be used instead of a logic circuit.

Fifth Embodiment

Figure 9:
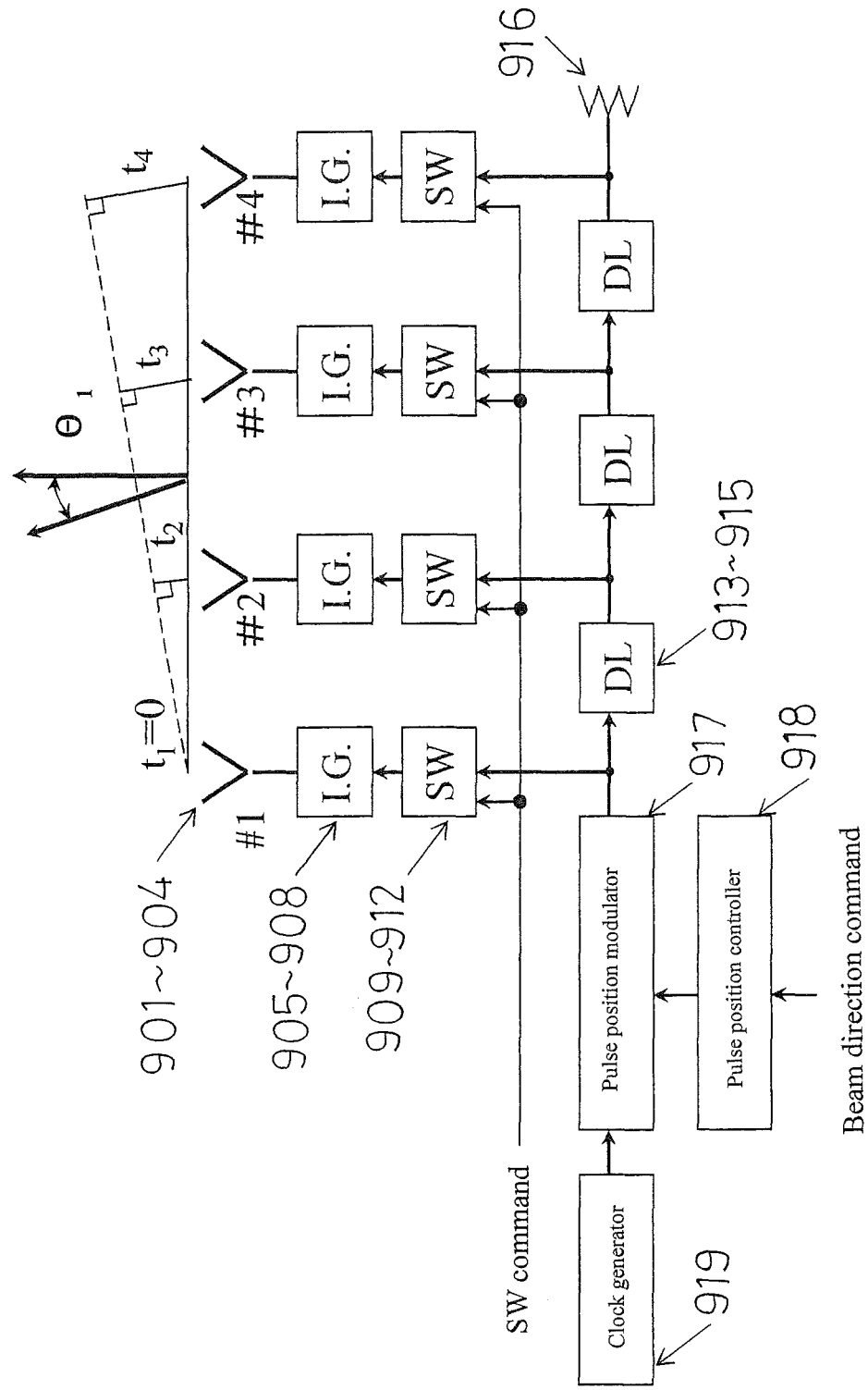
FIG. 9 is a view illustrating an example of the constitution of the UWB electronic scanning array antenna of this invention, in which the constitution of the embodiment of FIG. 8 is changed.

The embodiment illustrated in FIG. 9 uses a clock generator 919 and a pulse position modulator 917 instead of the variable frequency trigger generator 817 used in the embodiment illustrated in FIG. 8.

Namely, the embodiment illustrated in FIG. 9 is a UWB electronic scanning array antenna for transmission which uses the pulse position modulator 917, a pulse position controller 918, and a clock generator 919 instead of the variable frequency trigger generator 817 and the trigger frequency controller 818 used in the embodiment illustrated in FIG. 8.

As in the first embodiment, four antenna elements 901 to 904 are respectively connected to impulse generators 905 to 908 instead of the phase shifters 301 to 308 in the conventional example of FIG. 1.

The four impulse generators 905 to 908 are respectively connected to the one common pulse position modulator 917. A plurality of delay lines 913 to 915 are connected in series to the pulse position modulator 917. The impulse generators 905 to 908 are connected to different positions of a wiring through which the delay lines 913 to 915 are connected in series to the pulse position modulator 917.

Namely, in order to control the impulse generation timing, the transmission trigger from the pulse position modulator 917 is supplied from one end of the array through the delay lines 913 to 915 connected to between the antenna elements 901 to 904, and a terminator 916 is provided on the other end.

According to the above constitution, the timing of generating the impulse from each of the impulse generators 905 to 908 is controlled.

In the transmission trigger frequency variable method of the fourth embodiment (FIG. 8), when the trigger frequency is changed, the transmission carrier frequency also changes.

However, in this embodiment (FIG. 9), the clock frequency is constant, and the carrier frequency does not change. Moreover, pulse position modulation is performed by the pulse position modulator 917, whereby the pulse position modulation can be realized, and it is advantageous to enable the information communication.

The pulse position is finely controlled by the pulse position modulator 917 to enable error correction of the delay lines 913 to 915. Moreover, a partially controlled transmission trigger can be given to an antenna element group designated from all the antenna elements 901 to 904. Thus, control can be performed so that some of the antenna elements 901 to 904 are divided to direct the beam in another direction.

Since the phase of the reception wave can be changed by 180 degrees by the antenna elements 901 to 904, the antenna elements have the advantage of being able to be easily used as a monopulse direction finding antenna.

The operation of the UWB electronic scanning array antenna for transmission of this embodiment will be described with reference to FIGS. 10 and 11.

Figure 10:
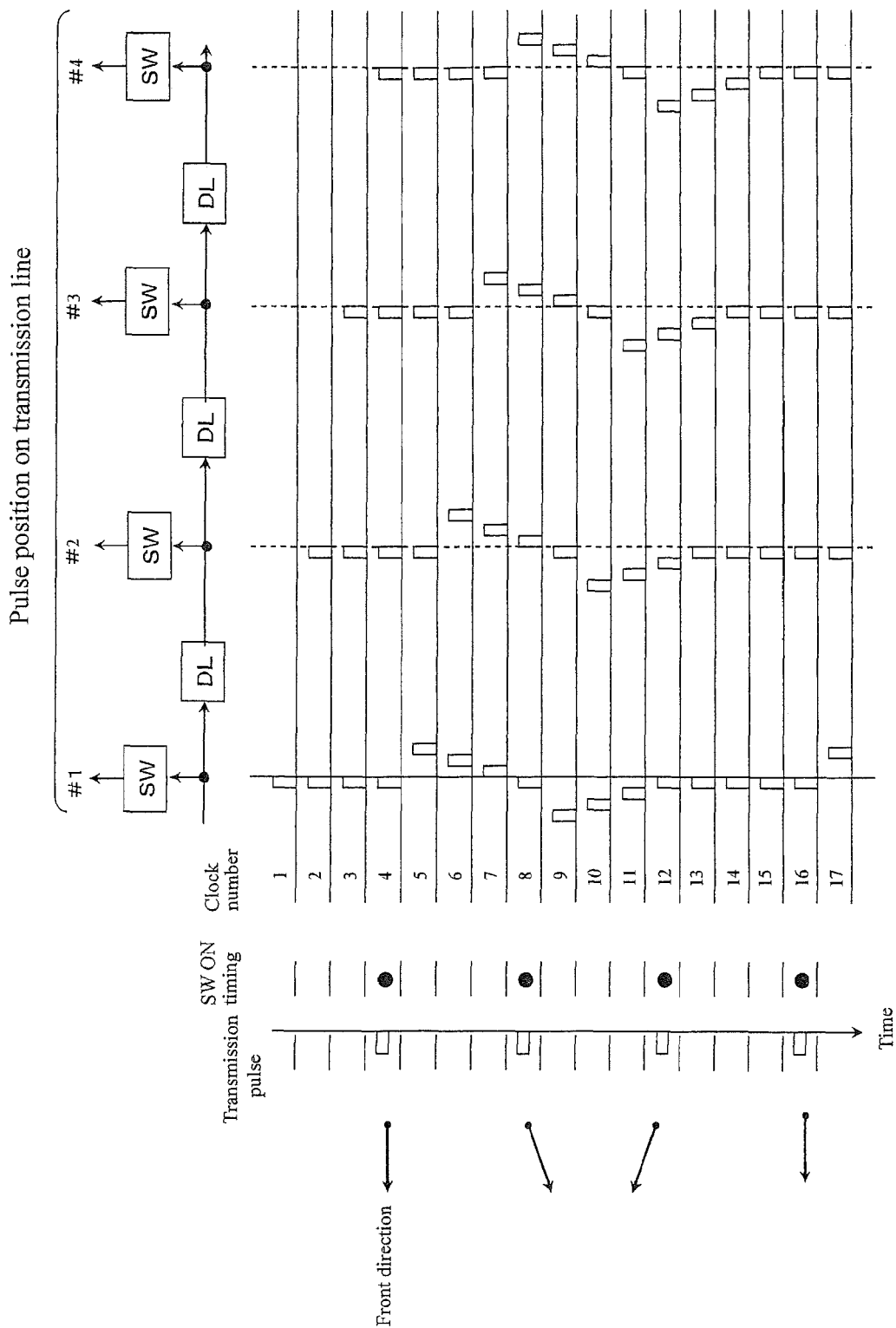
FIG. 10 is a view for explaining an operation of the UWB electronic scanning array antenna of FIG. 9.
Figure 11:
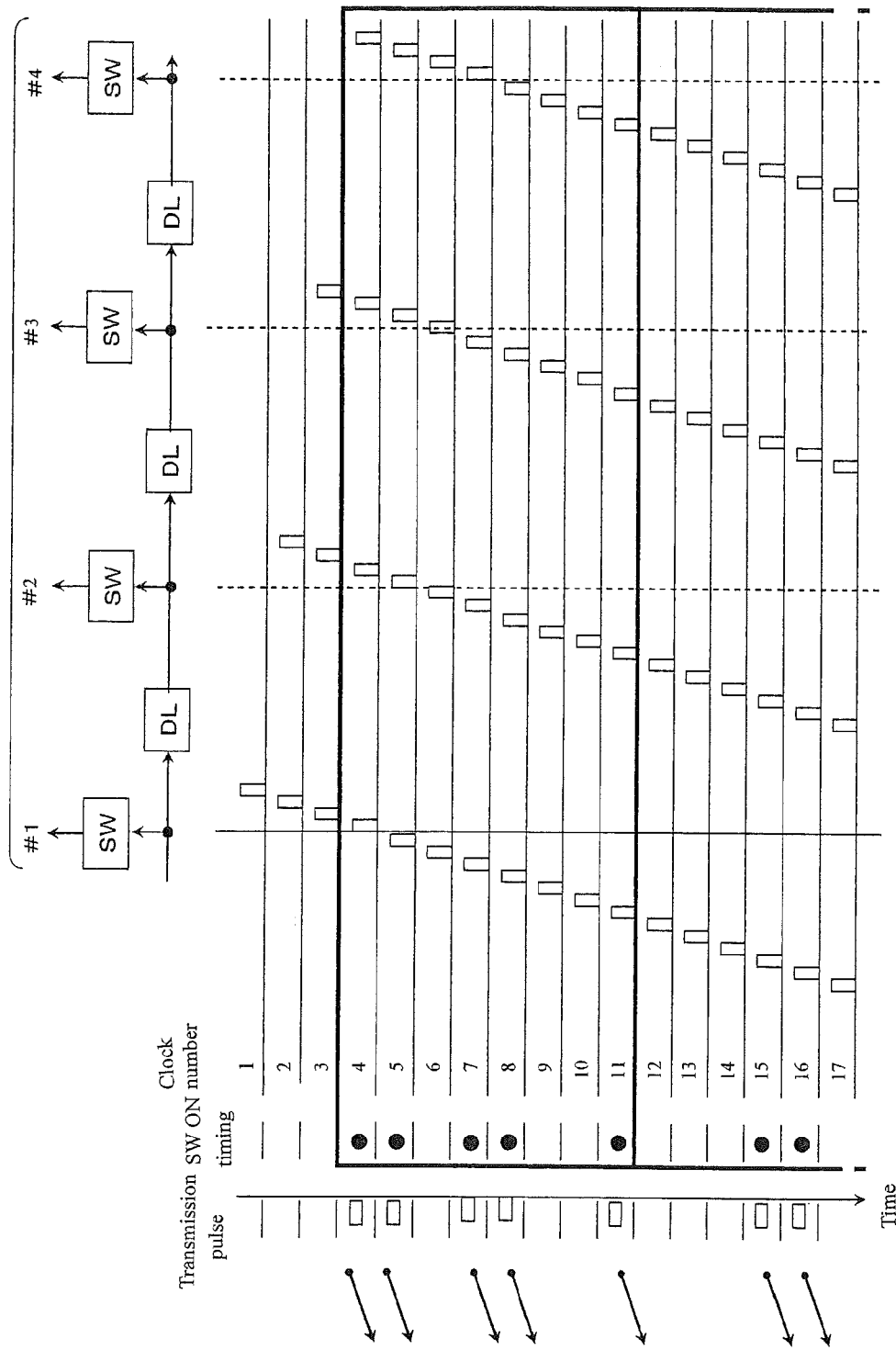
FIG. 11 is a view for explaining another operation of the UWB electronic scanning array antenna of FIG. 9.

FIG. 10 mainly describes an operation of changing the beam direction. FIG. 11 describes an ASK modulation operation.

The pulse number in FIG. 10 ("clock number" in FIG. 10) is the number of the pulse input from the pulse position modulator 917 to the end of a transmission path (position #1) in which delay lines DL are disposed in series.

In FIG. 10, the pulse number ("clock number" in FIG. 10) represents the input order of pulses, and the pulse number 1 is the first input pulse. The input pulse is transmitted from #1 toward #4 through the delay lines DL.

The switches SW of #1 to #4 receive the SW command to be simultaneously turned on/off. When the switches SW are turned on, each of the antenna elements of #1 to #4 generates a transmission impulse on the rise of an incoming pulse.

When the beam is directed in the front direction, as illustrated in the pulse numbers 1 to 4, each pulse is input in the same time interval as the delay amounts of the delay lines DL.

When the pulse of the pulse number 1 arrives at #4, the pulse of the pulse number 2 and the pulse of the pulse number 3 respectively arrive at #3 and #2 at the same time, and the pulse of the pulse number 4 is just input to #1 in this timing.

When all the switches SW are turned on in the above timing (a circle of SW ON timing illustrated on the side of the pulse number 4 in FIG. 10), the transmission pulses are simultaneously emitted from each of the antenna elements of #1 to #4. Thus, the beam directs in the front direction.

Next, a case in which the beam is directed in a left direction (#1 direction) will be described. As illustrated in the pulse numbers 5 to 8, the pulse is input with a time interval longer by only ΔT than the delay amount of the delay line DL (the pulse position is shifted backward). The delay amount of the delay line DL is sufficiently larger than ΔT, and therefore, when the input of the pulse number 7 to #1 is completed, the pulse of the pulse number 5 does not yet arrive at #4. However, the pulse of the pulse number 5 arrives at #4 first from a time when the input of the pulse number 7 to #1 is completed to a time when the input of the pulse number 8 is completed. Subsequently, the pulse of the pulse number 6 and the pulse of the pulse number 7 respectively arrive at #3 and #2 so as to be delayed by only ΔT. Finally, the pulse of the pulse number 8 is input to #1.

If all the switches SW are turned on from the time when the input of the pulse number 7 to #1 is completed to the time when the input of the pulse number 8 is completed (a circle of the SW ON timing illustrated on the side of the pulse number 8 in FIG. 10), the transmission impulses are emitted from each of the antenna elements of #1 to #4 in order of #4, #3, #2, and #1 so as to be delayed by ΔT. Thus, the beam directs in the left direction (#1 direction).

Next, a case in which the beam directs in the right direction (#4 direction) will be described. As illustrated in the pulse numbers 9 to 12, the pulse is input with a time interval shorter by only ΔT than the delay amount of the delay line DL (the pulse position is shifted forward).

When the rise of the pulse number 12 is input to #1, the pulses of the pulse numbers 9 to 11 do not yet arrive at #4 to #2. However, the pulse of the pulse number 11 arrives at #2 first from after the input of the rise of the pulse number 12 to #1 to the input of the pulse number 13, and then the pulse of the pulse number 10 and the pulse of the pulse number 9 respectively arrive at #3 and #4 so as to be delayed by only ΔT.

Thus, if all the switches SW are turned on from the time when the input of the pulse number 11 to #1 is completed to the time when the input of the pulse number 12 is completed (a circle of the switch SW ON timing illustrated on the side of the pulse number 12 in FIG. 10), the transmission impulses are emitted from each of the antenna elements of #1 to #4 in order of #1, #2, #3, and #4 so as to be delayed by ΔT. Thus, the beam directs in the right direction (#4 direction).

As described above, the switches SW are turned on all together when the transmission trigger in a delay timing corresponding to the beam direction is provided, and the transmission trigger is applied to each antenna element; therefore, the time interval of radio waves (synthesized wave as the array antenna) actually emitted from an antenna is determined by the interval of turning on of the switch SW. In FIG. 10, the switch SW is turned on at the pulse numbers 4, 8, 12, and 16, that is, the switch SW is turned on for each four pulses at a fixed interval.

In the method of varying the trigger frequency, in order to change the beam direction, when the trigger frequency is changed, the carrier frequency is changed. However, as described above, in this invention, the method of changing the position of the trigger pulse has an advantage that in order to change the beam method, even if the pulse position is changed, the carrier frequency is fixed and not changed.

Next, the operation of the modulation (ASK) will be described with reference to FIG. 11.

An example of a case in which the beam is directed in the left direction (#1 direction) will be described. Each pulse is input with a time interval longer by only ΔT than the delay amount of the delay line DL (the pulse position is shifted backward).

In the illustrated embodiment, all the switches SW are turned on in the timings of the pulse numbers 4, 5, 7, 8, 11, 15, and 16 (circles of the SW ON timing illustrated on the sides of the pulse numbers), and the switches SW are turned off in the other timings. In FIG. 11, the numbers illustrated as "clock number" are the pulse numbers.

Detailed timing of turning on the switch SW will be described using, as an example, the timing of turning on the switch SW of the pulse number 4.

The operation is performed so that all the switches SW are turned on from a time when the input of the pulse number 3 to #1 is completed to a time when the input of the pulse number 4 is completed. In this case, the transmission impulses are emitted from the each of antenna elements of #1 to #4 in order of #4, #3, #2, and #1 so as to be delayed by ΔT.

Thus, the impulse wave in which the beam directs in the left direction (#1 direction) is transmitted.

As in the case of the pulse number 4, the impulse wave in which the beam directs in the left direction (#1 direction) is transmitted in the timings of the pulse numbers 5, 7, 8, 11, 15, and 16.

Thus, in this example, binary information that it is 11011001000110 is transmitted in the timing of the pulse number 4 as the beginning during a period from the pulse number 4 to the pulse number 17.

Since the operation is performed as described above, the switch SW is turned on/off by the SW command in accordance with the communication information, whereby the ASK modulated (OOK) impulse wave is emitted from the antenna.

Figure 12:
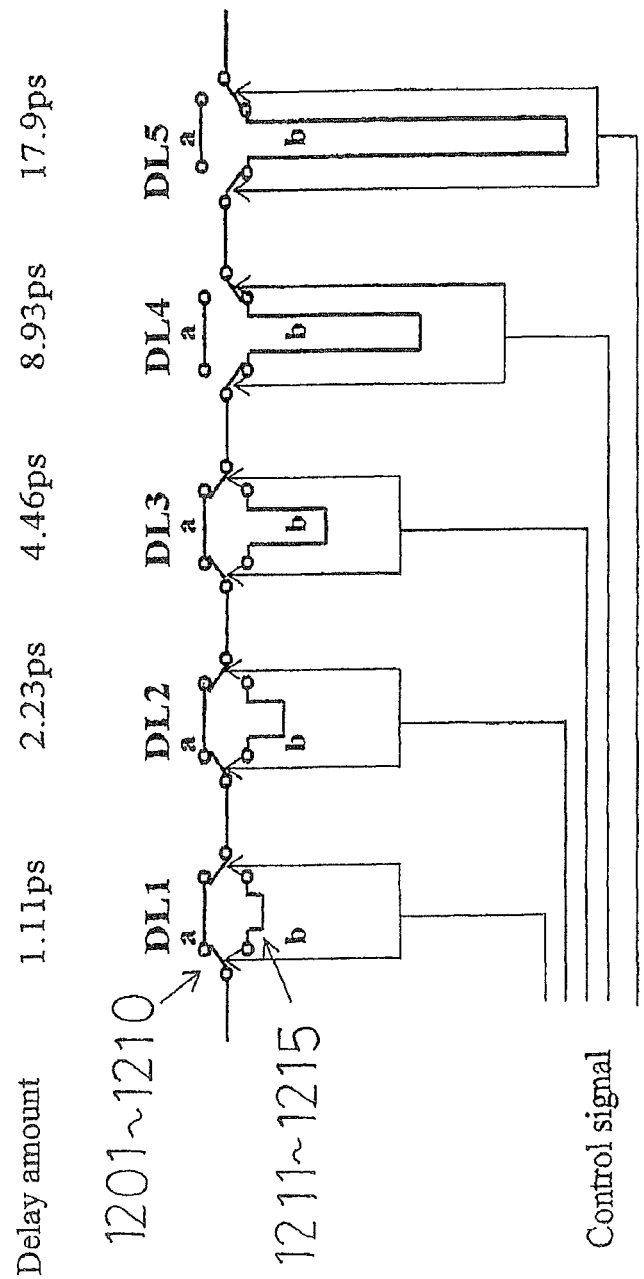
FIG. 12 is a view for explaining an example of a constitution of a pulse position modulator adopted as the UWB electronic scanning array antenna of this invention.

Next, a configuration example of the pulse position modulator 917 is illustrated in FIG. 12.

Each delay line section is constituted of delay lines 1211 to 1215 and changing-over switches SW 1201 to 1210.

The operation is performed so that when each switch is at a position a, a control signal detours the delay line and goes direct, and only when the switch is at a position b, the control signal passes through the delay line.

Thus, the switches SW 1201 to 1210 attached respectively to delay line sections DL1 to DL5 are separately controlled by the control signal, whereby the delay amount of an arbitrary combination of each of the delay lines 1211 to 1215 of DL1 to DL5 (from 0 to up to the sum of DL1 to DL5) can be obtained.

In this embodiment, although the delay line is used, a delay element using an LCR and a semiconductor and an element utilizing the delay of a gate of a logic may be used.

By virtue of the above operation, in the clock pulse input from the clock generator 919, the delay amount can be changed by the control signal for each pulse, and the operation as the pulse position modulator 917 is performed.

Sixth Embodiment

Figure 13:
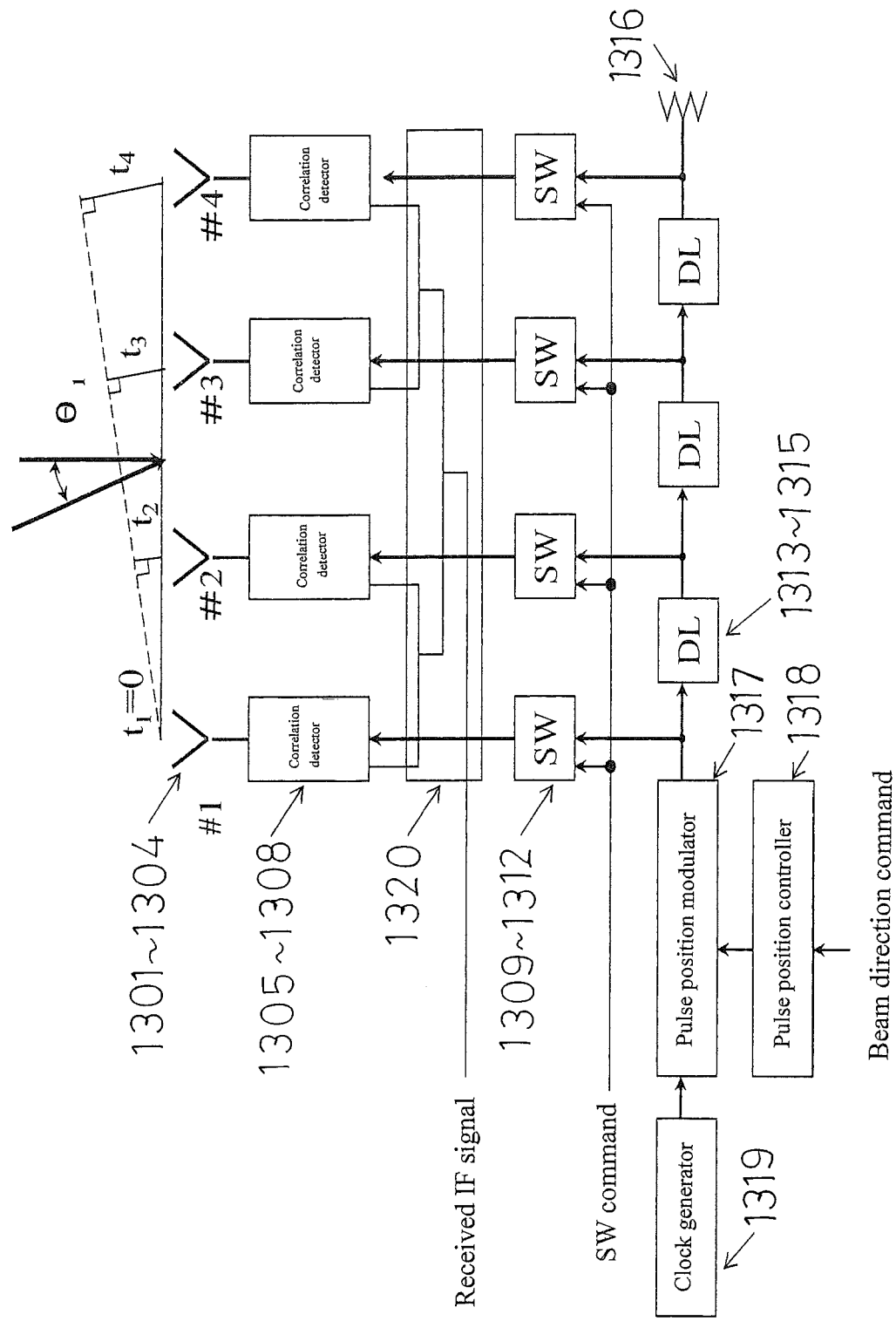
FIG. 13 is a view illustrating another constitution of the UWB electronic scanning array antenna of this invention.

Another example of the constitution of the UWB electronic scanning array antenna of this invention is illustrated in FIG. 13.

This embodiment will describe an example of the UWB electronic scanning array antenna for reception using correlation detectors 1305 to 1308 instead of the impulse generators 905 to 908 of the fifth embodiment (FIG. 9).

As in the second embodiment, four antenna elements 1301 to 1304 are respectively connected to the correlation detectors 1305 to 1308 instead of the phase shifters 301 to 308 in the conventional example of FIG. 1.

The four correlation detectors 1305 to 1308 are respectively connected to one common pulse position modulator 1317. A plurality of delay lines 1313 to 1315 are connected in series to the pulse position modulator 1317. The correlation detectors 1305 to 1308 are connected to different positions of a wiring through which the delay lines 1313 to 1315 are connected in series to the pulse position modulator 1317.

Namely, a reception trigger is supplied from one end of the array through the delay lines 1313 to 1315 connected to between the antenna elements 1301 to 1304, and a terminator 1316 is provided on the other end. According to this constitution, the timing of inputting the reception trigger to each of the correlation detectors 1305 to 1308 is controlled.

As described in the fifth embodiment (FIG. 9), the pulse position modulator 1317 is connected to a pulse position controller 1318 and a clock generator 1319.

The correlation detectors 1305 to 1308 sequentially sample a received signal with a reception trigger to be frequency converted to a video band.

A time difference is imparted to the generation timing of the reception trigger input to each of the correlation detectors 1305 to 1308 of #1 to #4, whereby the directional characteristics of the antenna elements 1301 to 1304 as the receiving antennas can be changed.

The generation timing of the reception trigger is similar to the operating principle described using FIG. 10. The interval of the pulse (pulse position) input from the pulse position modulator 1317 to transmission paths of the delay lines 1313 to 1315 is changed to thereby perform control.

The switches SW 1309 to 1312 are turned on in the timing in which the reception trigger with a time difference is provided in each of #1 to #4, whereby the reception triggers with time differences are input to the correlation detectors 1305 to 1308. According to this constitution, the received signal is sequentially sampled, whereby a video band signal with directional characteristics can be obtained.

In the video band power synthesizer used in the above embodiment, since the frequency is lower than that of the RF band electric power distributor used in the conventional example of FIG. 1, the video band power synthesizer can be easily fabricated as described in the second embodiment.

The correlation detectors 1305 to 1308 may have a constitution similar to the constitution described in the second embodiment using FIG. 6. An AD convertor is used as the means of the correlation detection instead of a mixer, and even if an output pulse of the impulse generator is input as a sampling pulse for AD conversion to the AD convertor, a similar effect can be obtained as described in the second embodiment.

Seventh Embodiment

Figure 14:
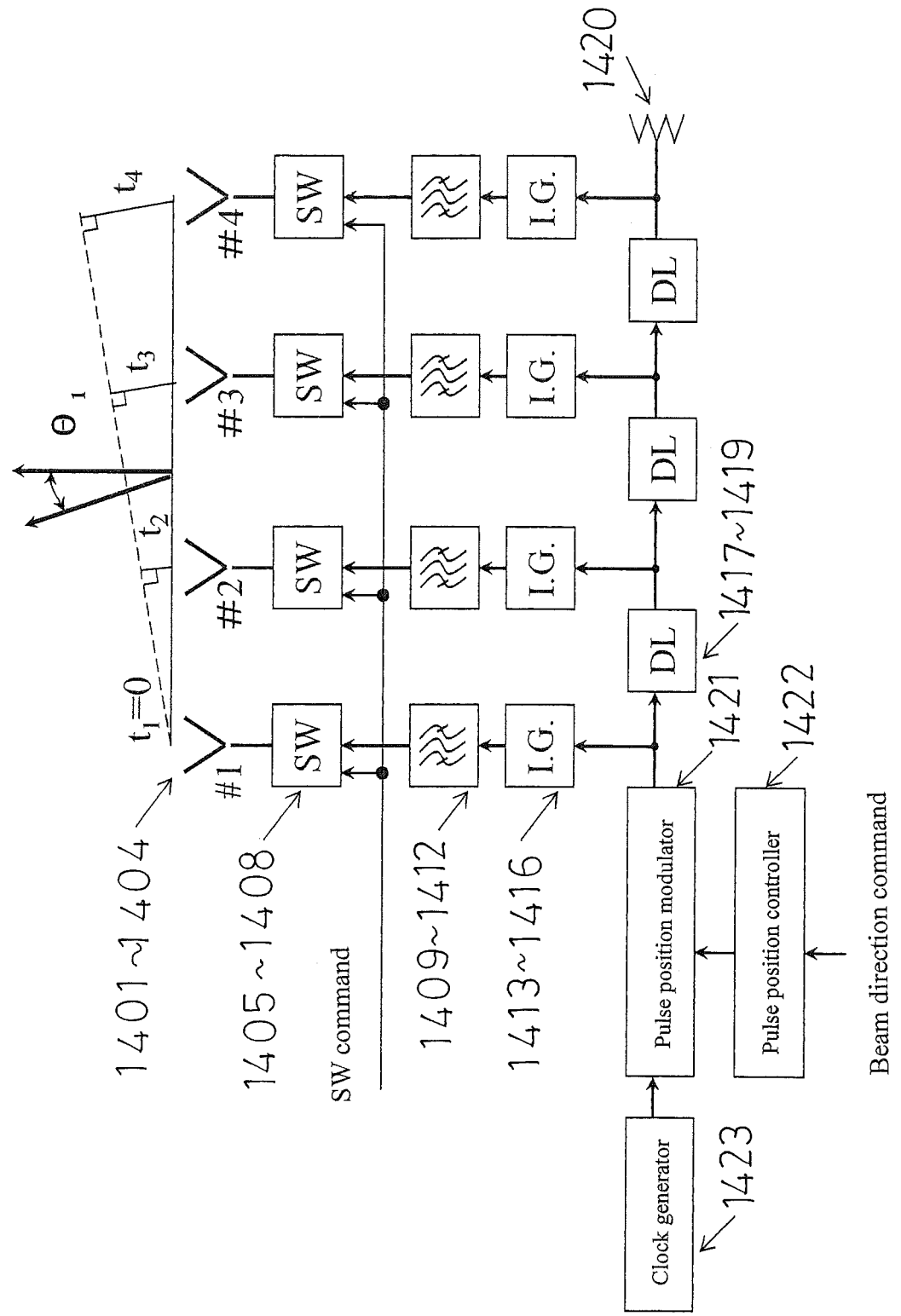
FIG. 14 is a view illustrating still another constitution of the UWB electronic scanning array antenna of this invention.

FIG. 14 describes an example of the UWB electronic scanning array antenna for transmission in which a band-pass filter is attached to an output of an impulse generator, and a switch turning on/off the output is provided.

Four antenna elements 1401 to 1404 are respectively connected to impulse generators 1413 to 1416 through band-pass filters 1409 to 1412 and switches SW 1405 to 1408.

As in the embodiment of FIG. 9, the four impulse generators 1413 to 1416 are respectively connected to one common pulse position modulator 1421.

A plurality of delay lines 1417 to 1419 are connected in series to the pulse position modulator 1424. The impulse generators 1413 to 1416 are connected to different positions of a wiring through which the delay lines 1417 to 1419 are connected in series to the pulse position modulator 1421.

Namely, in order to control the impulse generation timing, a transmission trigger from the pulse position modulator 1421 is supplied from one end of the array through the delay lines 1417 to 1419 connected to between the antenna elements 1401 to 1404, and a terminator 1420 is provided on the other end.

According to the above constitution, the timing of generating the impulse from each of the impulse generators 1413 to 1416 is controlled.

As in the embodiment of FIG. 9, a pulse position controller 1422 and a clock generator 1423 are connected to the pulse position modulator 1421.

The operation of this embodiment illustrated in FIG. 14 will be described with reference to FIGS. 15A to 15D and FIG. 25.

The impulse generators 1413 to 141 have a constitution described using FIG. 4 in the embodiment 1. In a spectrum on a frequency axis of a transmission impulse waveform output from the impulse generators 1413 to 1416, a harmonic appears at a fixed interval as illustrated in FIGS. 15A and 15B.

When the transmission impulse is passed through the band-path filters 1409 to 1412 with the center frequency corresponding to a frequency of the harmonic, the transmission impulse becomes a continuous wave with the frequency as illustrated in FIG. 15C.

When the continuous wave is turned on/off by the switches SW 1405 to 1408, the ASK modulation waveform illustrated in FIG. 15D is obtained.

In the continuous wave, since the phase can be controlled by the pulse position of the trigger pulse, the directional characteristics of the antenna can be changed by the pulse position modulator 1421.

Figure 25:
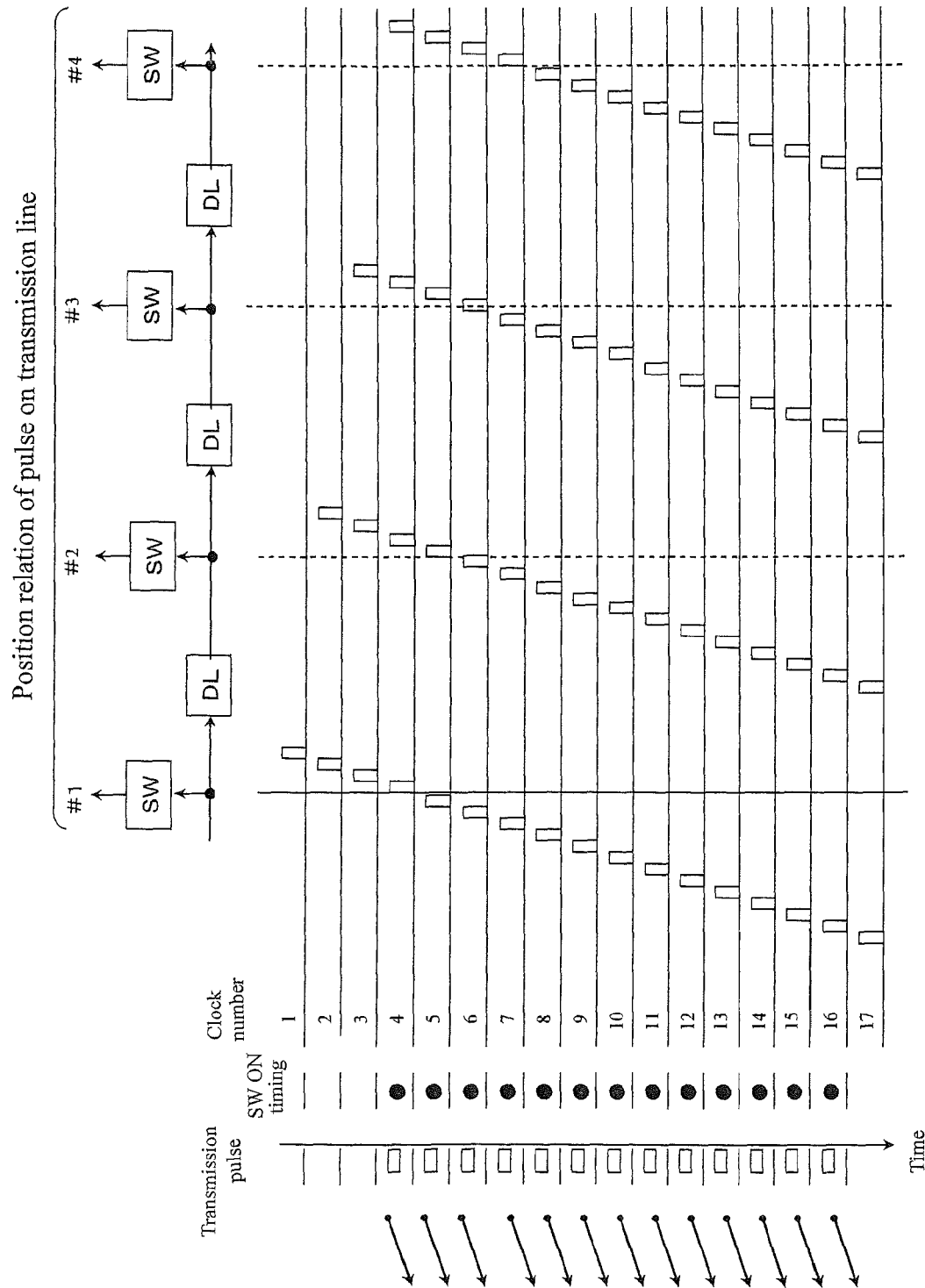
FIG. 25 is a view for explaining an operation of the UWB electronic scanning array antenna of FIG. 14.

The operation in a case in which the beam directs in the left direction (#1 direction) and the continuous wave is transmitted will be described with reference to FIG. 25.

Each pulse is input with a time interval longer by only ΔT than the delay amounts of the delay lines (DL) 1417 to 1419 (the pulse position is shifted backward). When the pulse passes toward the antenna elements 1401 to 1404 (#1 to #4), each of impulse generators (IG) 1413 to 1416 is triggered. The generated impulse becomes a continuous wave by the band-pass filters 1409 to 1412.

With regard to the timing when each trigger pulse triggers each impulse generator, since the pulse interval is long relative to the delay amount of the delay line DL, the pulse of the clock number 1 arrives at #4 to trigger, and thereafter, #3, #2, and #1 are sequentially triggered with a slight delay.

Since the delay of trigger causes a delay of the phase of the continuous wave of a band-pass filter output, the beam directs in the left direction (#1 direction).

At that time, when the switches SW 1405 to 1408 are turned on during a period from the clock numbers 4 to 16, during this period, the continuous wave is transmitted so that the beam directs in the left direction (#1 direction).

The switches SW 1405 to 1408 are turned on/off in accordance with the SW command, whereby the ASK modulation can be enabled.

Eighth Embodiment

Figure 16:
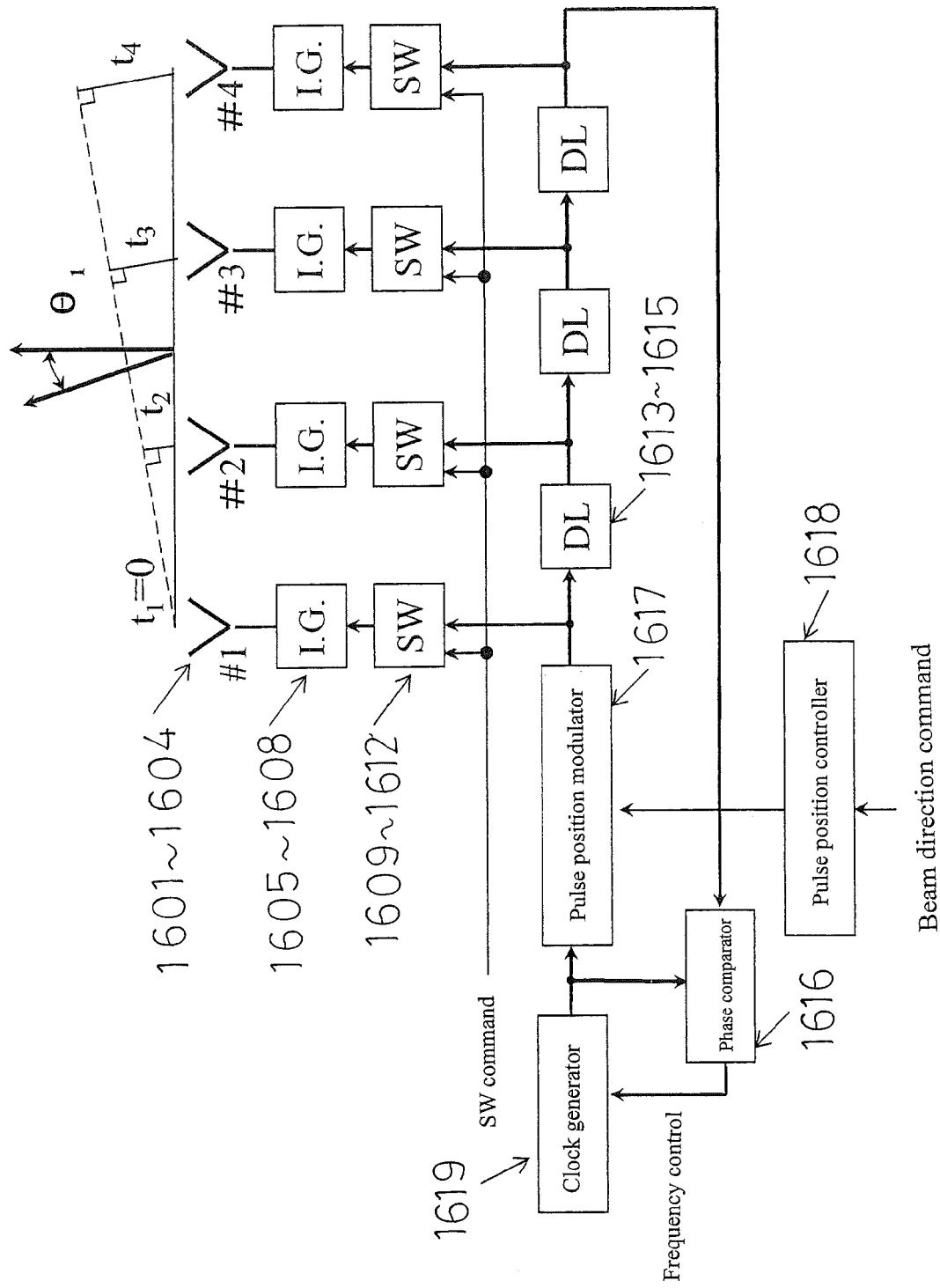
FIG. 16 is a view for explaining another embodiment of the UWB electronic scanning array antenna of FIG. 9.

FIG. 16 describes another embodiment of the UWB electronic scanning array antenna for transmission illustrated in FIG. 9.

Four antenna elements 1601 to 1604 are respectively connected to impulse generators 1605 to 1608.

The four impulse generators 1605 to 1608 are connected to one common pulse position modulator 1617 respectively through switches SW 1609 to 1612.

A plurality of delay lines 1613 to 1615 are connected in series to the pulse position modulator 1617. Each of the impulse generators 1605 to 1608 are connected to different positions of a wiring through which the delay lines 1613 to 1615 are connected in series to the pulse position modulator 1617.

As in the embodiment of FIG. 9, a pulse position controller 1618 and a clock generator 1619 are connected to the pulse position modulator 1617.

A phase comparator 1616 is connected to a tail end of a wiring through which the delay lines 1613 to 1615 are connected in series to the pulse position modulator 1617.

The phase comparator 1616 receives an input from the clock generator 1619.

In this embodiment, a phase of a trigger signal at the position where the phase comparator 1616 is connected and a phase of a signal output from the clock generator 1619 are compared with each other by the phase comparator 1616.

Namely, the clock generator 1619 capable of frequency control and the phase comparator 1616 are provided, and a final output of a delay line transmission path and an output of the clock generator 1619 are phase-compared. Thereby, a change of the delay amount due to, for example, a temperature change of the delay lines 1613 to 1615 is detected, and the frequency of the clock generator 1619 is controlled, so that the delay time is corrected.

In this embodiment, for example, the final output of the transmission path of the delay lines 1613 to 1615 and the output of the clock generator 1619 are phase-compared with each other by the phase comparator 1616. A change of the phase relationship is detected, and the frequency of the clock generator 1619 is controlled to keep a constant phase relationship.

According to the above constitution, the delay time can be corrected with respect to the change of the delay amount due to, for example, the temperature change of the delay lines 1613 to 1615.

The pulse position is changed, and even if the pulse position controller 1618 is controlled through the phase comparator 1616 so as to keep a constant phase relationship, a similar effect can be obtained. In this case, the comparison result obtained in the phase comparator 1616 is input to the pulse position controller 1618 inputting a pulse position control signal to the pulse position modulator 1617.

Ninth Embodiment

A control of the beam direction performed by the UWB electronic scanning array antenna of this invention will be described with reference to FIG. 17.

1 to #16 are antenna elements 1701 to 1716 constituted of an antenna, an impulse generator, and a switch SW. In this embodiment, four antenna elements are arranged horizontally in a row, and the four antenna elements are further arranged so as to be stacked longitudinally in four stages.

In order to change the direction of beam to an elevation (El) direction, four variable delay lines 1733 to 1736 controlled by a delay line controller 1737 are each arranged at an input of each stage.

The four variable delay lines 1733 to 1736 are connected in series to a plurality of (three) delay lines (DL) 1717 to 1728. Each of the antenna elements 1701 to 1716 are connected, through each impulse generator, to different positions of wirings through which the (three) delay lines (DL) 1717 to 1728 are connected in series to each of the variable delay lines 1733 to 1736.

Namely, in order to control the impulse generation timing, a transmission trigger is supplied from one end of the array through the delay lines (DL) 1717 to 1728 connected to between the antenna elements 1701 to 1716, and terminators 1729 to 1732 are provided on the other end.

According to the above constitution, the trigger frequency is changed by a variable frequency trigger generator 1738, and the beam direction is changed to an azimuth (Az) direction. At the same time, the delay amounts of the variable delay lines 1733 to 1736 in each stage is controlled, whereby the beam direction can be changed to the elevation (El) direction.

The switches SW in the antenna elements #1 to #16 are used for ASK modulation or transmission interval adjustment.

Tenth Embodiment

Figure 18:
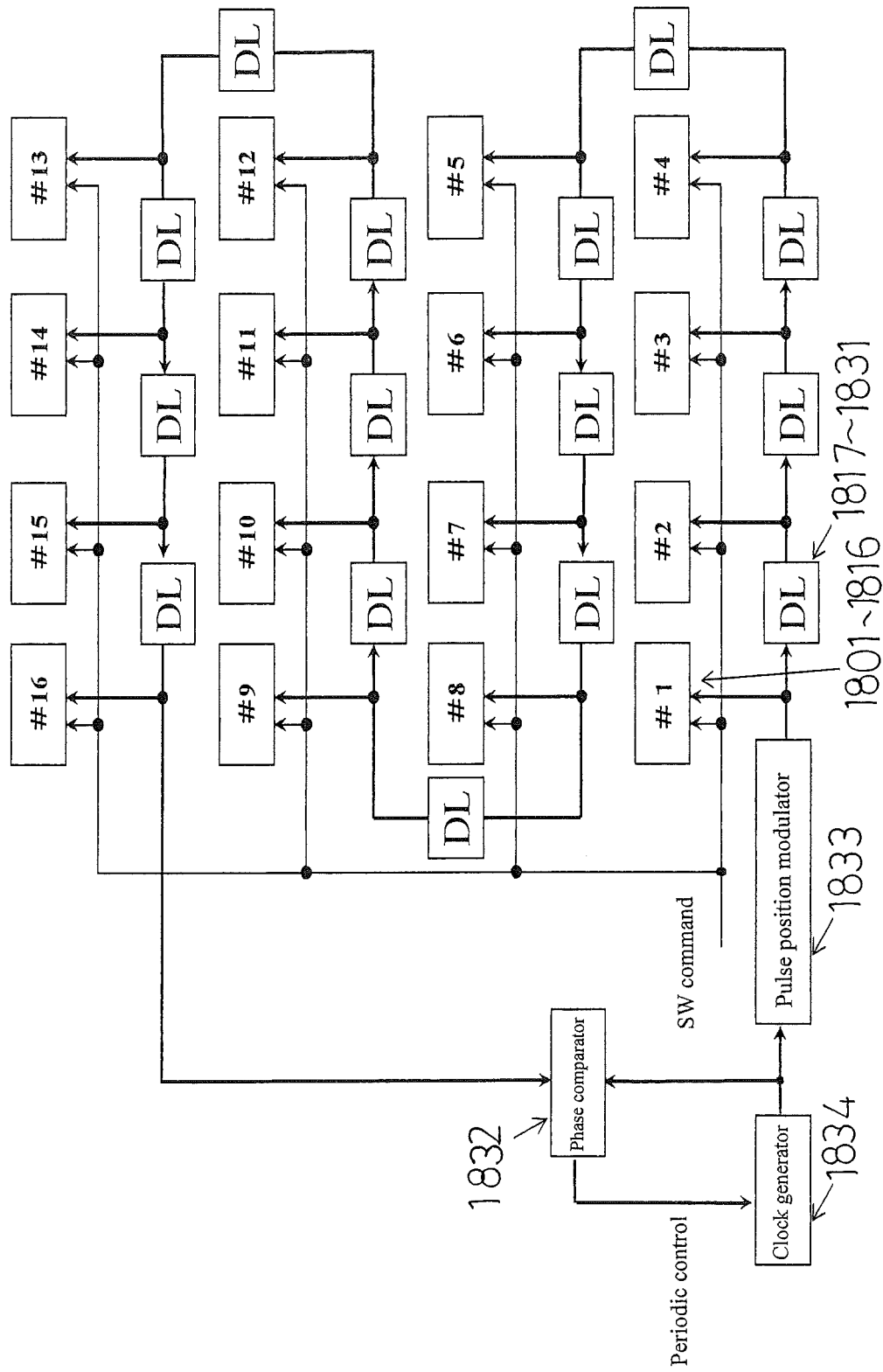
FIG. 18 is a view for explaining another example of the control of the beam direction performed by the UWB electronic scanning array antenna of this invention.

Another control of the beam direction performed by the UWB electronic scanning array antenna of this invention will be described with reference to FIG. 18.

In this embodiment, antenna elements 1801 to 1816 represented by #1 to #16 are connected in cascade with delay lines 1817 to 1831. #1 to #16 are the antenna elements 1801 to 1816 constituted of an antenna, an impulse generator, and a switch SW.

The transmission timing of each element can be individually arbitrarily determined at the position of the transmission trigger pulse generated from a pulse position modulator 1833 connected to the input of the transmission path of the delay lines 1817 to 1831.

The beam direction is determined by changing the transmission timing of each of the antenna elements #1 to #16, and therefore, when the transmission trigger pulse corresponding to the beam direction arrives at each antenna element, if the switch SW is turned on by the SW command, radio waves can be emitted in an arbitrary direction.

In this embodiment, the output of the tail end of the transmission path of the delay lines 1817 to 1831 and an output of a clock generator 1834 are input to a phase comparator 1832 to detect a change of the phase relationship, and, thus, to control the frequency of the clock generator 1834 to keep a constant phase relationship.

According to the above constitution, the delay time can be corrected with respect to the change of the delay amount due to, for example, a temperature change of the delay lines 1817 to 1831, and highly accurate and stable determination of the beam direction and communication can be realized.

Figure 19:
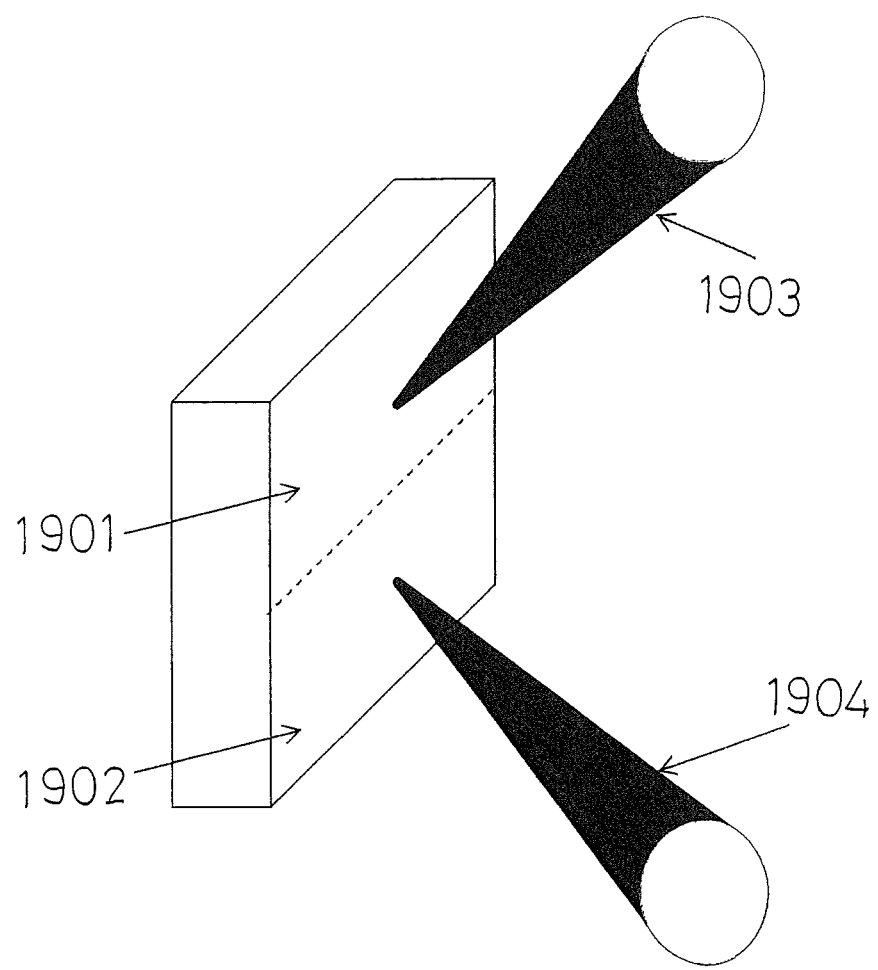
FIG. 19 is a view for explaining an example of the beam direction controlled by the embodiment of FIG. 18.

According to the above constitution, as illustrated in FIG. 19, in a portion of an antenna element connected in cascade, the beam direction different for each of antenna surfaces 1901 and 1902, that is, beam directions 1903 and 1904 may be set.

According to the method of controlling the pulse position, the antenna elements may not be arranged linearly at a constant interval, and the method has an advantage that the beam direction can be controlled even if the antenna elements are arranged in a curved manner in a planar array in which elements are arranged planarly at irregular intervals.

Eleventh Embodiment

Figure 20:
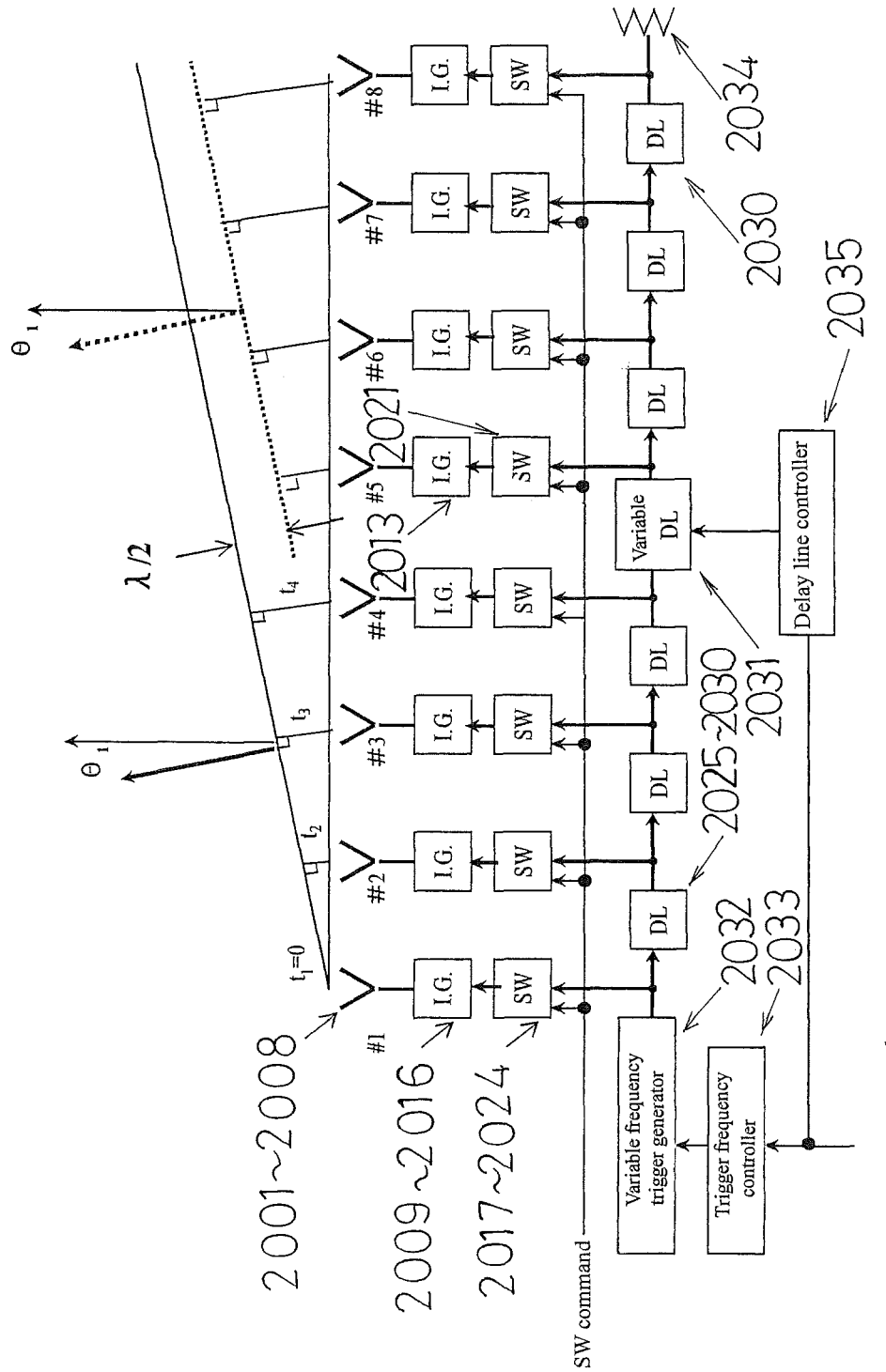
FIG. 20 is a view for explaining another example of the control of the beam direction performed by the UWB electronic scanning array antenna of this invention.

Another control of the beam direction performed by the UWB electronic scanning array antenna of this invention will be described with reference to FIGS. 20 and 21.

In this embodiment, the number of the antennas of the first embodiment of FIG. 2 is doubled, and the center delay line is replaced with a variable delay line 2031.

Impulse generators 2009 to 2016 are connected to eight antenna elements 2001 to 2008 having the same constitution as the first embodiment. The eight impulse generators 2009 to 2016 are respectively connected to one common trigger generator 2032 through switches SW 2017 to 2024, a plurality of delay lines 2025 to 2030, and a variable delay line 2031. In this embodiment, the variable delay line 2031 is controlled by a delay line control circuit 2035.

In this embodiment, as in the first embodiment, the transmission trigger frequency is changed to thereby change the beam direction.

When the delay amount of the variable delay line 2031 is set to the same as the delay amounts of the delay lines 2025 to 2030, the same operation as in the first embodiment is performed.

This embodiment is different from the first embodiment in that the time delay in which the delay amount of the variable delay line 2031 is $\lambda/2$ of the transmission frequency is added to the delay amount of the delay line. According to this constitution, in comparison with wave fronts transmitted in a beam direction $\theta_1$ from the antenna elements 2001 to 2004 (#1 to #4), the phase of the wave front transmitted in the beam direction $\theta_1$ from the antenna elements 2005 to 2008 (antenna #5 to #8) is different by $\lambda/2$.

When expressed by the phase, the angle is different by 180 degrees, so that the antenna gain is reduced in the beam direction $\theta_1$.

The operation will be described using an antenna pattern in FIG. 21.

Figure 21:
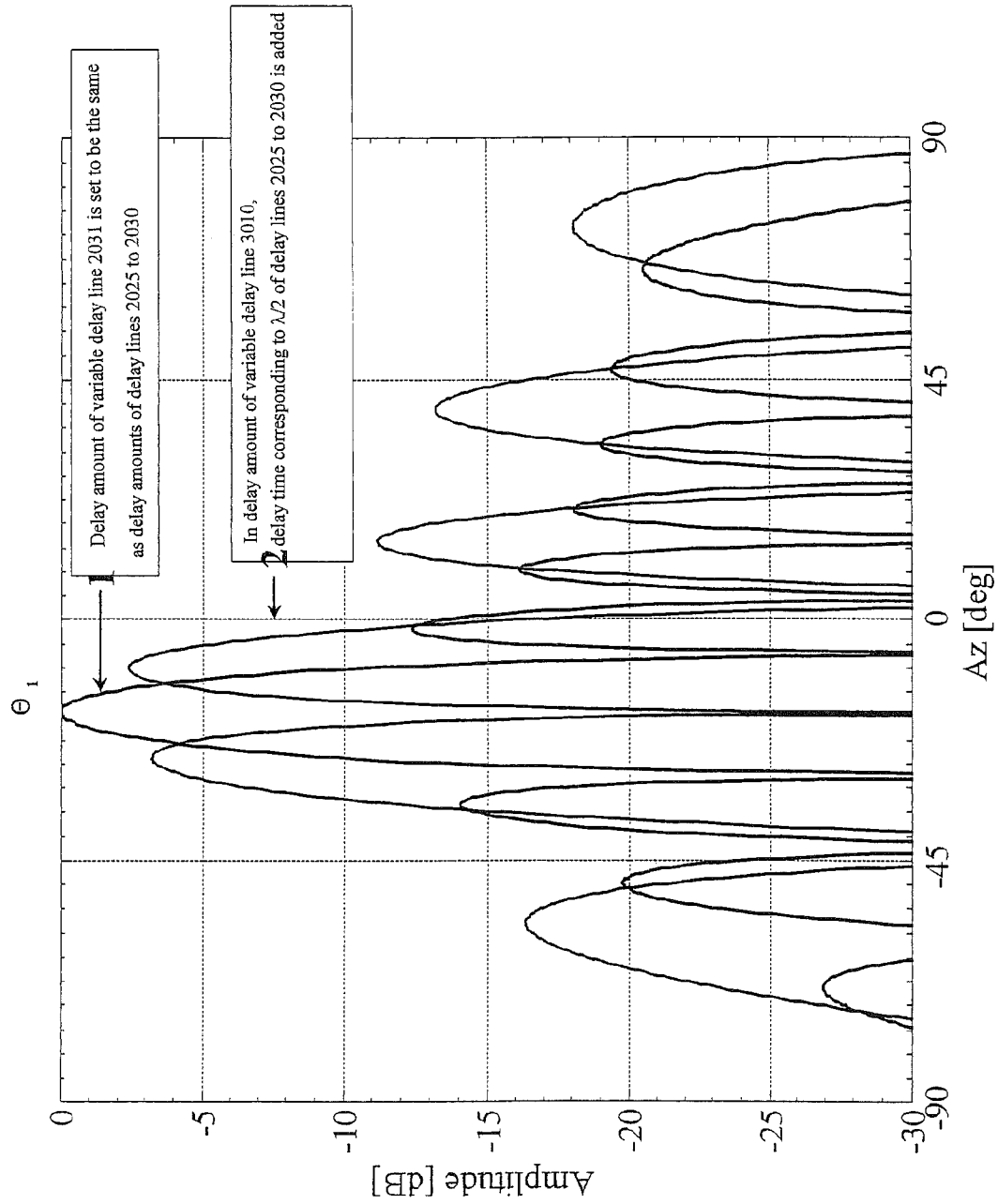
FIG. 21 is a view for explaining an example of an antenna pattern in a method illustrated in FIG. 20.

In an antenna pattern 1 in FIG. 21, a maximum gain is obtained in the beam direction $\theta_1$ as in the first embodiment. In comparison with that, in an antenna pattern 2 in FIG. 21, the gain is rapidly reduced in the beam direction $\theta_1$. The rapid reduction in the antenna pattern can be used for radar direction finding. For example, when the antenna is used in a transmission antenna of a radar, the variable delay line 2031 is switched by a variable delay line controller 2035 to thereby obtain maximum and minimum outputs in the beam direction $\theta_1$, and reception levels reflected from a target of the radar become the maximum and minimum values.

It is characterized in that a target orientation can be found minutely by measuring an orientation where the reception level is maximum and the minimum value is taken. Thus, the use as a monopulse antenna is allowed.

In this embodiment, even if the time delay in which the delay amount of the variable delay line 2031 is $\lambda/2$ of the transmission frequency is subtracted from the delay amounts of the delay lines, the same can be said obviously.

Twelfth Embodiment

Figure 22:
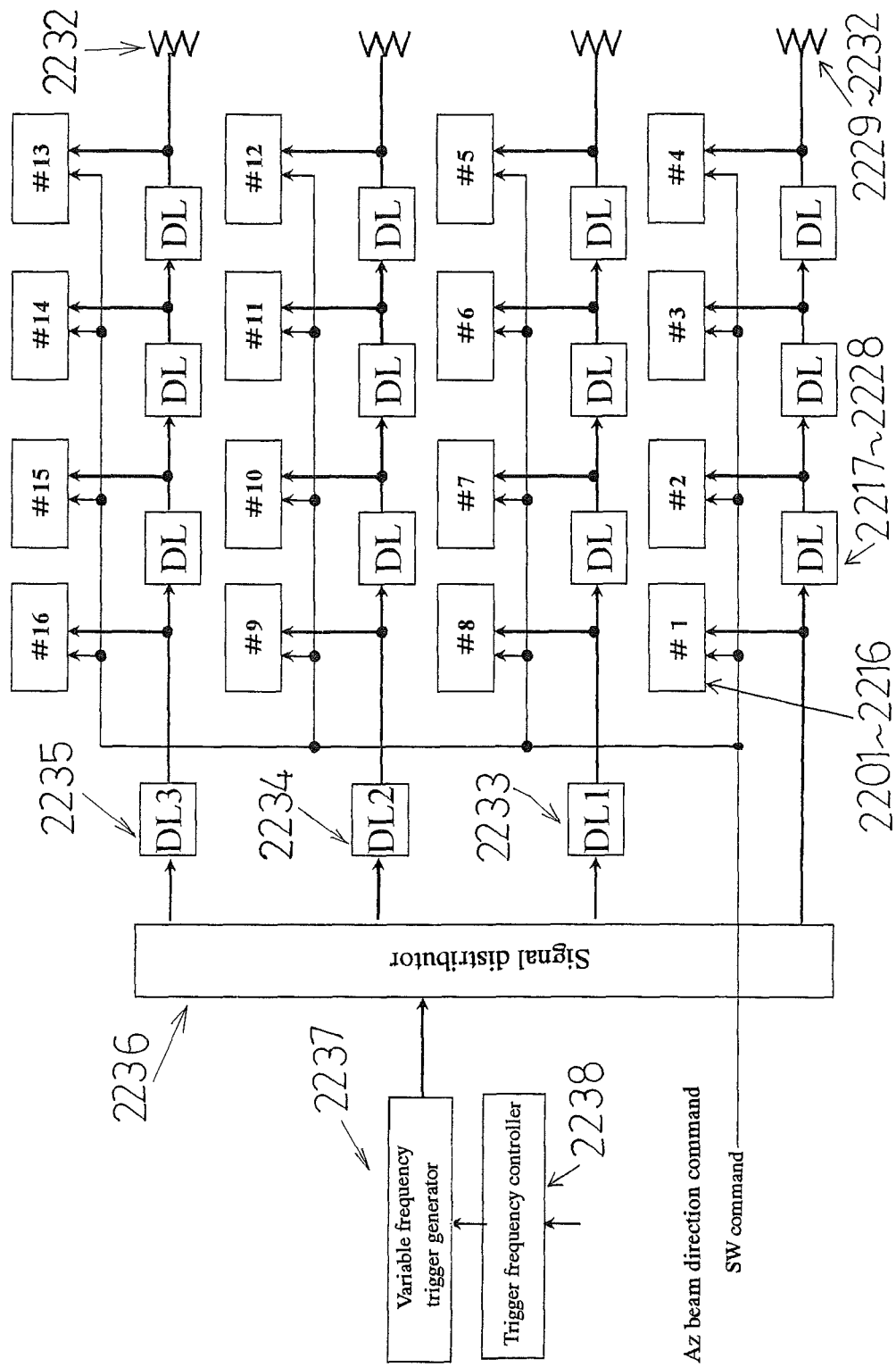
FIG. 22 is a view for explaining another example of the control of the beam direction performed by the UWB electronic scanning array antenna of this invention.

Another control of the beam direction performed by the UWB electronic scanning array antenna of this invention will be described with reference to FIG. 22.

Figure 17:
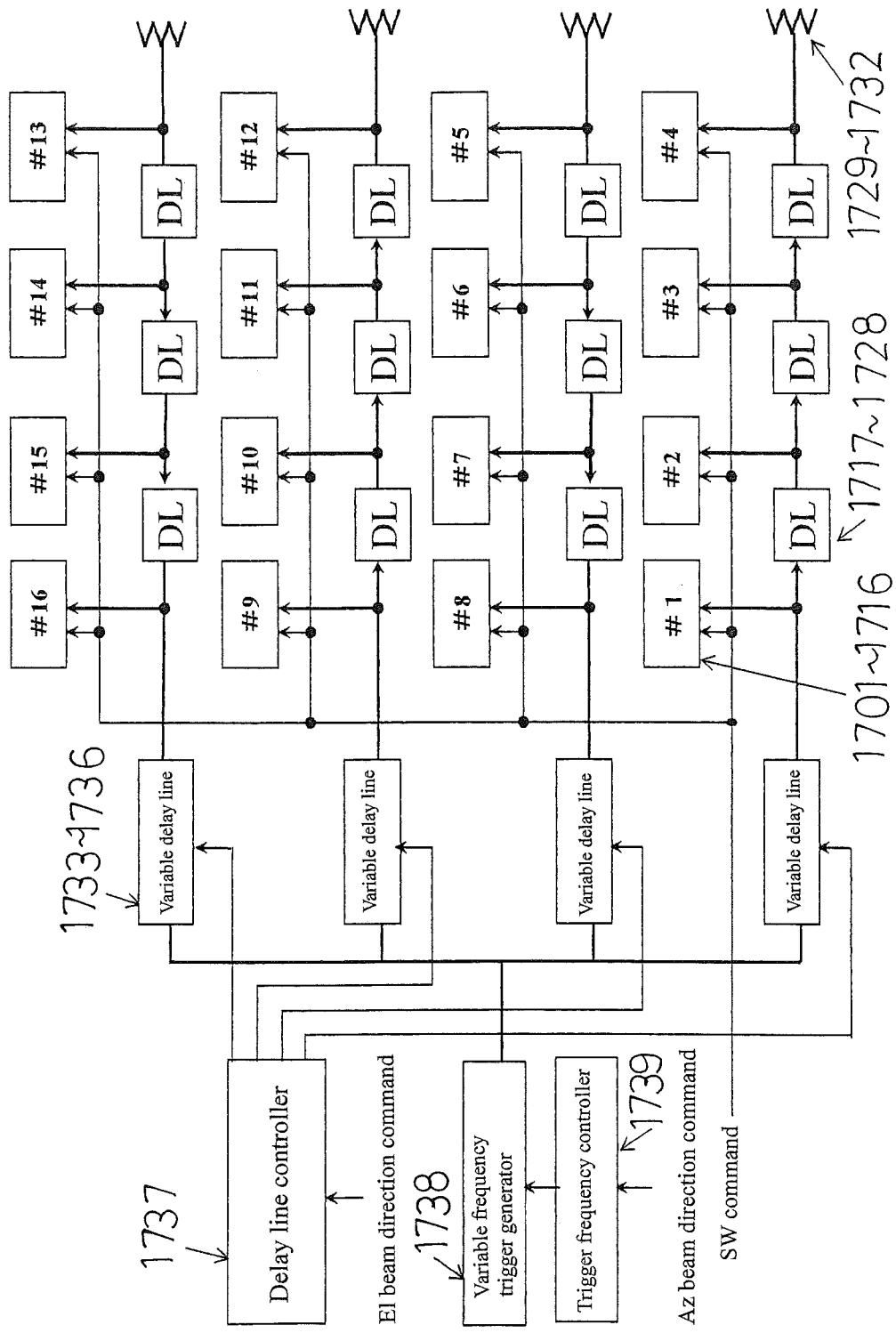
FIG. 17 is a view for explaining an example of a control of a beam direction performed by the UWB electronic scanning array antenna of this invention.

This embodiment will describe an example of the UWB electronic scanning array antenna for transmission, in which a signal distributor 2236 and delay lines 2233 to 2235 are used instead of the variable delay lines 1733 to 1736 and the variable delay line controller 1737 of the ninth embodiment (FIG. 17).

As in the ninth embodiment (FIG. 17), four antenna elements are arranged horizontally in a row, and the four antenna elements are further arranged so as to be stacked longitudinally in four stages. #1 to #16 are antenna elements 2201 to 2216 constituted of an antenna, an impulse generator, and a switch SW.

In the ninth embodiment (FIG. 17), in order to change the beam direction to the elevation (El) direction, the four variable delay lines 1733 to 1736 provided at an input of each stage and controlled by the variable delay line controller 1737 are used. In this embodiment, the signal distributor 2236 and the delay lines 2233 to 2235 are used instead of the variable delay lines 1733 to 1736 and the variable delay line controller 1737.

The delay lines 2233 to 2235 receiving an input from the signal distributor 2236 are connected in series to a plurality of (three) delay lines (DL) 2217 to 2228. Each of the antenna elements 2201 to 2216 are connected, through each impulse generator, to different positions of wirings through which the delay lines (DL) 2217 to 2228 of the delay lines 2233 to 2235 are connected in series.

Namely, in order to control the impulse generation timing, a transmission trigger is supplied from one end of the array through the delay lines (DL) 2217 to 2228 connected to between the antenna elements 2201 to 2216, and terminators 2229 to 2232 are provided on the other end.

A signal from a variable frequency trigger generator 2237 is distributed by the signal distributor 2236 to be input to the delay lines 2233 to 2235.

The delay lines 2233 to 2235 provided from the second stage to the fourth stage are used for changing the beam direction to the elevation (El) direction.

In the ninth embodiment (FIG. 17), the variable delay lines 1733 to 1736 are used in each stage to control the delay amount, whereby the elevation (El) is changed. In this embodiment, the beam direction is changed by the delay amounts of the delay lines 2233 to 2235.

The trigger timing in each stage is different according to the delay amounts of the delay lines 2233 to 2235 with a predetermined delay difference, so that the elevation (El) is changed.

At that time, when the trigger frequency is changed by a trigger frequency controller 2238 in order to change the azimuth (Az), the elevation (El) is changed at the same time. The delay amounts of the delay lines 2233 to 2235 are one severalth of the delay amounts of the delay lines 2217 to 2228, and the rate of change of the elevation (El) is suppressed in comparison with the azimuth (Az).

In the delay lines 2233 to 2235, the delay amounts are determined so that the elevation (El) is constantly changed by the trigger frequency. In order to significantly change the elevation (El), the trigger frequency is required to be significantly changed. However, if the trigger frequency is significantly changed, the azimuth (Az) is changed too significantly to be used.

However, the azimuth (Az) has a periodicity in which the trigger interval (1/trigger frequency) is repeated by one integer-th of the delay amount of the delay line, and the beam directs in the front direction.

Meanwhile, although the same holds for the elevation (El), the delay amounts of the delay lines 2233 to 2235 are smaller than the delay amounts of the delay lines 2217 to 2288, and therefore, a trigger repetition period in which the beam directs in the front direction is long. Namely, the trigger repetition period of the elevation (El), in which the beam directs in the front direction, is longer than the trigger repetition period of the azimuth (Az), and therefore, if the trigger repetition period is arbitrarily selected, the azimuth (Az) and the elevation (El) in the beam can be set.

As described above, it is characterized that even if the variable delay lines 1733 to 1736 are not used, the trigger frequency is significantly changed (to several times larger than the trigger frequency), whereby the elevation (El) and the azimuth (Az) can be changed.

Thirteenth Embodiment

Figure 23:
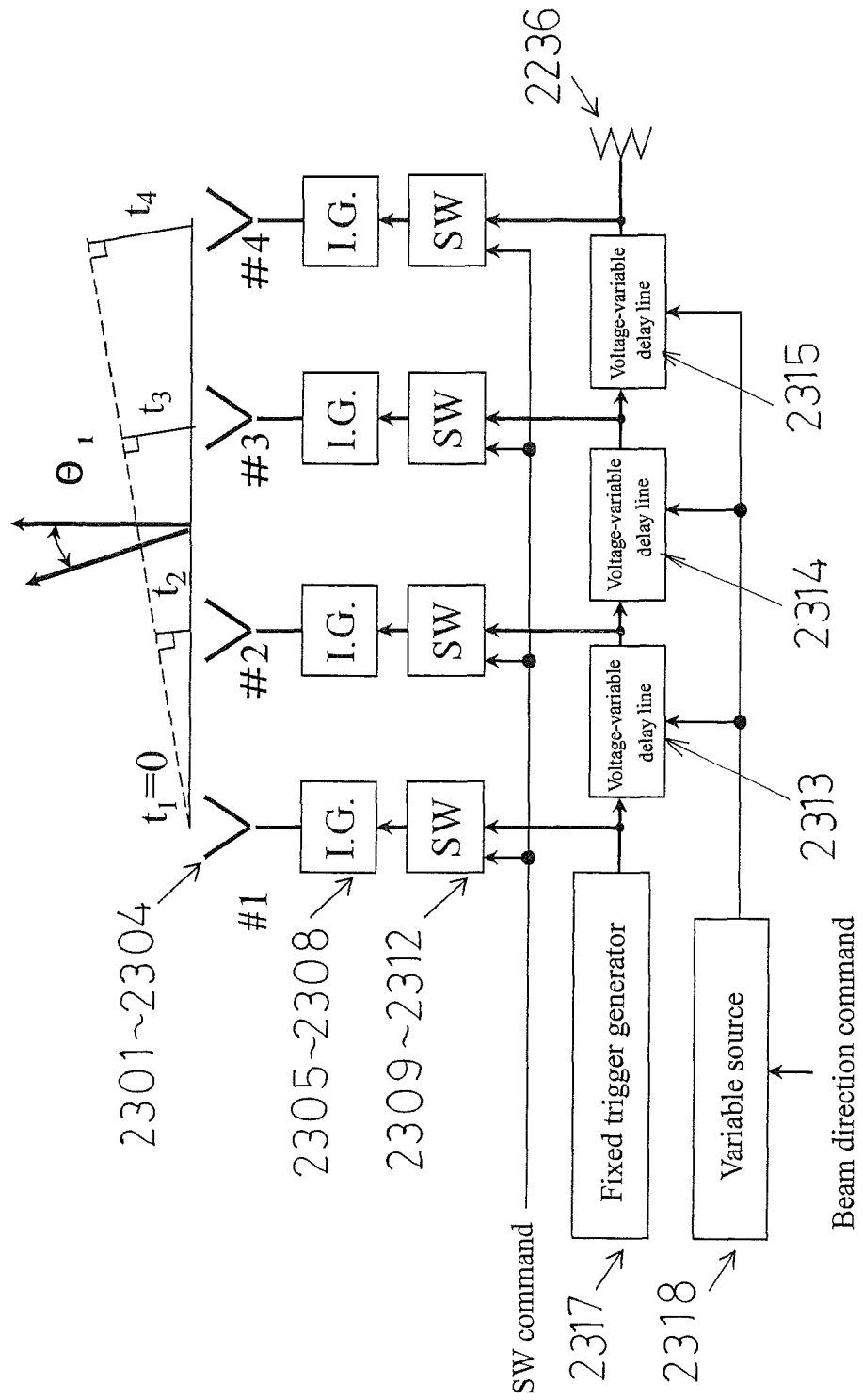
FIG. 23 is a view for explaining another example of the control of the beam direction performed by the UWB electronic scanning array antenna of this invention.

Another control of the beam direction performed by the UWB electronic scanning array antenna of this invention will be described with reference to FIGS. 23 and 24.

In this embodiment, a voltage-variable delay line capable of controlling the delay amount by a voltage is used instead of the delay line of the thirteenth embodiment, and the trigger interval of the trigger pulse input to the delay line is constant. The delay amount of the voltage-variable delay line is increased or reduced to thereby control the transmission timing of each antenna element.

Four antenna elements 2301 to 2304 are respectively connected to impulse generators 2305 to 2308.

The four impulse generators 2305 to 2308 are respectively connected to voltage-variable delay lines 2313 to 2315 through switches SW 2309 to 2312.

A plurality of the voltage-variable delay lines 2313 to 2315 are connected in series to a fixed trigger generator 2317. The voltage-variable delay lines 2313 to 2315 are connected to a common variable source 2318. The transmission trigger is supplied from one end of the voltage-variable delay lines 2313 to 2315 connected in series, and a terminator 2236 is provided on the other end.

A voltage supplied from the variable source 2318 to the voltage-variable delay lines 2313 to 2315 is changed, whereby the timing of generating impulses from the impulse generators 2305 to 2308 is controlled.

Figure 24:
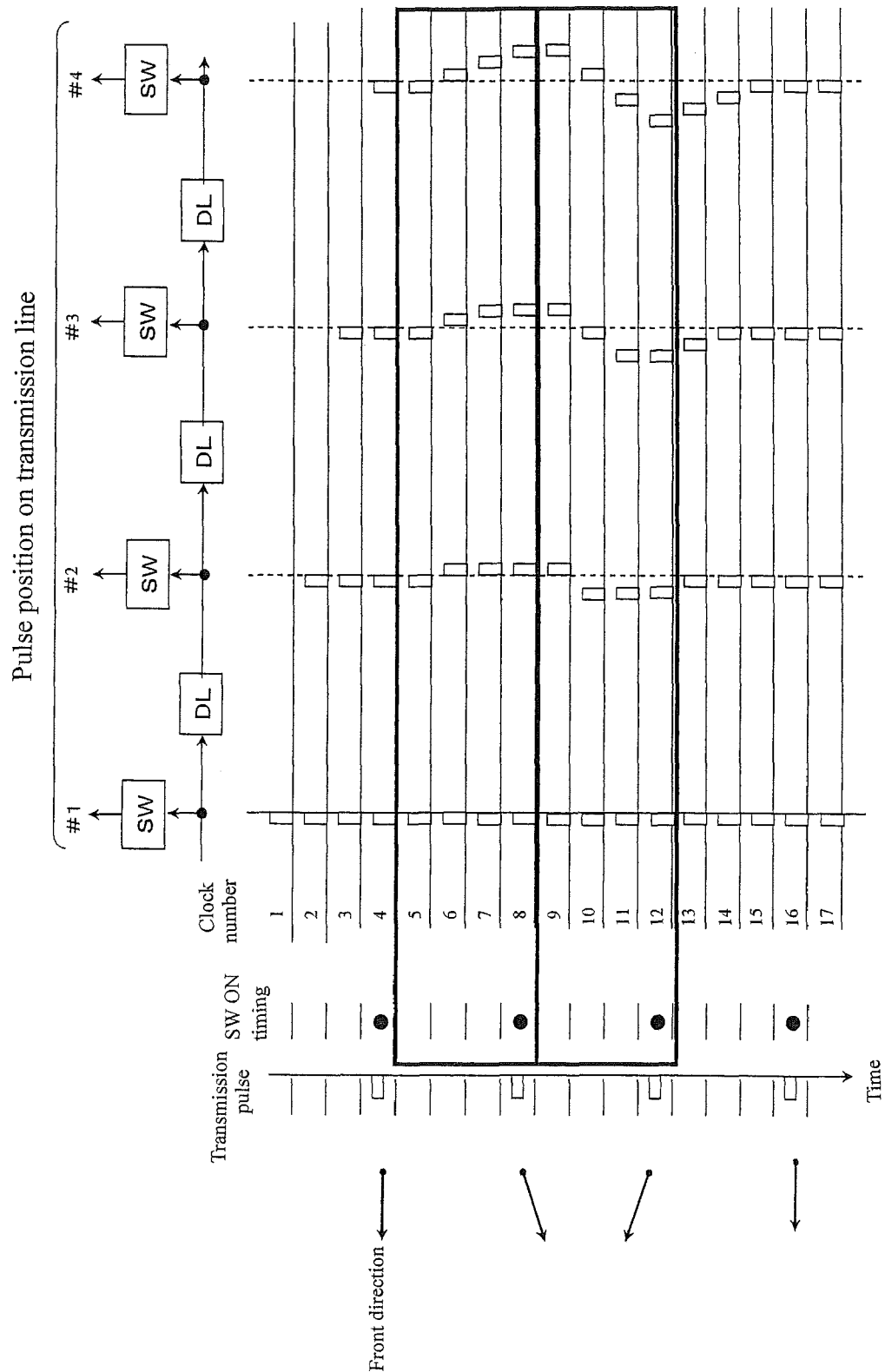
FIG. 24 is a view for explaining an operation of the UWB electronic scanning array antenna of FIG. 23.

In FIG. 24, the pulse number ("clock number" in FIG. 24) represents the input order of pulses, and the pulse number 1 is the first input pulse. The input pulse is transmitted toward the antenna elements 2301 to 2304 (#1 to #4) through the voltage-variable delay lines 2313 to 2315.

In the case of this embodiment, the trigger interval of the trigger pulse input from the fixed trigger generator 2317 to the voltage-variable delay lines 2313 to 2315 is constant.

Based on the delay amounts of the voltage-variable delay lines 2313 to 2315 when beam is directed in the front direction, when the beam is directed in the left direction (#1 direction), the delay amount is reduced, and when the beam is directed in the right direction (#4 direction), the delay amount is increased. In this manner, the transmission time of a transferred pulse is changed to thereby obtain a similar effect to that in the case in which the pulse position is changed.

In the illustrated embodiment, the increase and decrease of the delay amounts of the voltage-variable delay lines 2313 to 2315 are controlled by the variable voltage 2318.

When the beam is directed in the front direction, the delay amounts of the voltage-variable delay lines 2313 to 2315 are reference values, and the delay amount of each delay line is the same as the input pulse interval. Therefore, as illustrated in the pulse numbers (clock numbers) 1 to 4, when the pulse of the pulse number 1 arrives at #4, the pulses of the pulse numbers 2, 3, and 4 respectively arrive at #3, #2, and #1 at the same time.

When all the switches SW are turned on in the above timing (a circle of the SW ON timing illustrated on the side of the pulse number 4 of FIG. 24), the transmission impulses are simultaneously emitted from each of the antenna elements of #1 to #4. Thus, the beam directs in the front direction.

Next, a case in which the beam is directed in the left direction (#1 direction) will be described. In this case, control is performed so that the delay amounts of the voltage-variable delay lines 2313 to 2315 are reduced to be lower than a reference value during a period from the pulse numbers 5 to 8.

Thus, as illustrated in the pulse numbers 5 to 8, the travelling speed of the pulse is increased, the pulse of the pulse number 5 arrives at #4 first, and then the pulses of the pulse numbers 6, 7, and 8 respectively arrive at #3, #2, and #1 so as to be delayed by only ΔT.

When all the switches SW are turned on in the above timing (a circle of the SW ON timing illustrated on the side of the pulse number 8 of FIG. 24), the transmission impulses are emitted from each of the antenna elements #1 to #4 in order of #4, #3, #2, and #1 so as to be delayed by ΔT.

Thus, the beam directs in the left direction (#1 direction).

Next, a case in which the beam is directed in the right direction (#4 direction) will be described. In this case, control is performed so that the delay amounts of the voltage-variable delay lines 2313 to 2315 are increased to be larger than the reference value during a period from the pulse numbers 9 to 12. Thus, as illustrated in the pulse numbers 9 to 12, the travelling speed of the pulse is reduced, the pulse of the pulse number 12 arrives at #1 first, and then the pulses of the pulse numbers 11, 10, and 9 respectively arrive at #2, #3, and #4 so as to be delayed by only ΔT.

When all the switches SW are turned on in the above timing (a circle of the SW ON timing illustrated on the side of the pulse number 12 of FIG. 24), the transmission impulses are emitted from each of the antenna elements #1 to #4 in order of #1, #2, #3, and #4 so as to be delayed by ΔT. Thus, the beam directs in the right direction (#4 direction).

As described above, in this embodiment, the trigger interval of the trigger pulse input to the delay line is constant, and the delay amount of the voltage-variable delay line is controlled, whereby a similar effect to the method of changing the position of the trigger pulse can be obtained.

Hereinabove, although the preferred embodiments and examples of this invention have been described with reference to the attached drawings, the invention is not limited to the described embodiments and examples, but can be changed into various forms within the technical scope grasped from the description of the scope of the appended claims.

Industrial Applicability

According to this invention, the following effects are produced:

1) a high-priced broadband phase shifter is not required;
2) a controller of a phase shifter is not required;
3) the beam direction can be scanned with a transmission trigger interval, and control is simplified;
4) the number of components is reduced, and a low cost can be realized;
5) in the pulse position method, even if the beam direction is changed, the transmission carrier frequency remains constant;
6) an application to communication is allowed. A constitution using the delay lines with a small delay amount is allowed. Since individual phase control can be performed with respect to each antenna element, it is applicable to not only a linear array with linearly arranged elements but also a planar array with planarly arranged elements, an equally-spaced array, and an unequally-spaced array.

Thus, the UWB electronic scanning array antenna according to this invention and the beam direction control method used in the UWB electronic scanning array antenna are widely applicable to an anti-collision radar for vehicles, an approach surveillance radar, an imaging radar, an RFID system, and so on.

What is claimed is:

1. An electronic scanning array antenna comprising:
   a plurality of antenna elements constituting the electronic scanning array antenna are respectively connected to a single trigger generator through impulse generators;
   a different number of delay lines are provided between the trigger generator and each of the impulse generators to cause a time difference to occur between inputs to each of the antenna elements; and
   wherein a direction of a beam emitted from the electronic scanning array antenna is controlled by changing a transmission interval of the trigger generator.

2. The electronic scanning array antenna according to claim 1, wherein the trigger generator is a variable frequency trigger generator.

3. The electronic scanning array antenna according to claim 1, wherein a switch which performs on/off switching control of an input to each of the impulse generators based on an instruction of an on/off switching control signal is provided on the input side of each of the impulse generators.

4. The electronic scanning array antenna according to claim 1, wherein a narrowband filter is inserted into an output of the impulse generator.

5. An electronic scanning array antenna comprising:
   a plurality of antenna elements constituting the electronic scanning array antenna are respectively connected to a single trigger generator through a correlation detecting circuit or a sampling circuit;
   a different number of delay lines are provided between the trigger generator and each of the correlation detecting circuits or each of the sampling circuits to cause a time difference to occur between inputs to each of the antenna elements; and wherein a direction of a beam received by the electronic scanning array antenna is controlled by changing a reception interval of the trigger generator.

6. The electronic scanning array antenna according to claim 5, wherein a narrowband filter is inserted into an impulse generation output in the correlation detecting circuit or an impulse generation output in the sampling circuit.

7. An electronic scanning array antenna comprising:
a plurality of antenna elements constituting the electronic scanning array antenna are respectively connected to a single trigger generator through impulse generators;
the plurality of antenna elements are respectively connected to the trigger generator through a correlation detecting circuit or a sampling circuit;
a different number of delay lines are provided between the trigger generator and each of the impulse generators to cause a time difference to occur between inputs to each of the antenna elements, and, at the same time, a different number of delay lines are provided between the trigger generator and each of the correlation detecting circuits or each of the sampling circuits to cause a time difference to occur between inputs to each of the antenna elements;
wherein a direction of a transmission beam emitted from the electronic scanning array antenna is controlled by changing a transmission interval of the trigger generator; and
wherein a direction of a reception beam received by the electronic scanning array antenna is controlled by changing a reception interval of the trigger generator.

8. An electronic scanning array antenna, wherein:
an impulse generator is connected to each of a plurality of antenna elements constituting the electronic scanning array antenna;
each of the impulse generators is connected to a single pulse position modulator receiving an input of a clock pulse from a clock generator;
a different number of delay lines are provided between the pulse position modulator and each of the impulse generators to cause a time difference to occur between inputs to each of the antenna elements; and
wherein a direction of a beam emitted from the electronic scanning array antenna is controlled by changing a transmission interval of the pulse position modulator.

9. An electronic scanning array antenna wherein:
a correlation detecting circuit or a sampling circuit is connected to each of a plurality of antenna elements constituting the electronic scanning array antenna;
each of the correlation detecting circuits or each of the sampling circuits is connected to a single pulse position modulator receiving an input of a clock pulse from a clock generator;
a different number of delay lines are provided between the pulse position modulator and each of the correlation detecting circuits or each of the sampling circuits to cause a time difference to occur between inputs to each of the antenna elements; and
wherein a direction of a beam received by the electronic scanning array antenna is controlled by changing a reception interval of the pulse position modulator.

10. The electronic scanning array antenna according to claim 9, wherein a plurality of delay lines are connected in series to the pulse position modulator; a phase comparator is connected to a tail end or the middle of a wiring through which the plurality of delay lines are connected in series to the pulse position modulator; a phase of a trigger signal at a position where the phase comparator is connected and a phase of a signal output from the clock generator are compared with each other by the phase comparator; the comparison result of the phase comparator is input to the clock generator or input to a pulse position controller which inputs a pulse position control signal to the pulse position modulator.

* * * * *